US009754337B2

(12) United States Patent
Brooker et al.

(10) Patent No.: US 9,754,337 B2
(45) Date of Patent: Sep. 5, 2017

(54) SERVER-SIDE, VARIABLE DRIVE HEALTH DETERMINATION

(71) Applicant: Amazon Technologies, Inc., Reno, NV (US)

(72) Inventors: Marc J. Brooker, Seattle, WA (US); Madhuvanesh Parthasarathy, Renton, WA (US); Danny Wei, Seattle, WA (US); Tobias L. Holgers, Seattle, WA (US); Yu Li, Seattle, WA (US)

(73) Assignee: Amazon Technologies, Inc., Seattle, WA (US)

( * ) Notice: Subject to any disclaimer, the term of this patent is extended or adjusted under 35 U.S.C. 154(b) by 198 days.

(21) Appl. No.: 14/243,752

(22) Filed: Apr. 2, 2014

(65) Prior Publication Data

US 2014/0214447 A1    Jul. 31, 2014

Related U.S. Application Data

(62) Division of application No. 13/434,446, filed on Mar. 29, 2012, now Pat. No. 8,719,320.

(51) Int. Cl.
G06F 17/30 (2006.01)
G06F 3/06 (2006.01)
G06Q 50/22 (2012.01)
G06Q 10/10 (2012.01)
G06F 11/00 (2006.01)

(52) U.S. Cl.
CPC ............ *G06Q 50/22* (2013.01); *G06F 11/00* (2013.01); *G06Q 10/10* (2013.01)

(58) Field of Classification Search
USPC ....... 707/827; 711/170, 100; 714/2; 709/206
See application file for complete search history.

(56) References Cited

U.S. PATENT DOCUMENTS

| 4,144,583 A | 3/1979 | Lawson et al. |
|---|---|---|
| 4,357,656 A | 11/1982 | Saltz et al. |
| 5,075,804 A | 12/1991 | Deyring |
| 5,438,559 A | 8/1995 | Best et al. |
| 5,627,842 A | 5/1997 | Brown et al. |
| 5,757,818 A | 5/1998 | Ashuri |
| 5,784,323 A | 7/1998 | Adams et al. |
| 5,828,583 A | 10/1998 | Bush et al. |
| 5,895,438 A | 4/1999 | Yomtoubian |

(Continued)

OTHER PUBLICATIONS

U.S. Appl. No. 13/434,446, filed Mar. 29, 2012.

(Continued)

*Primary Examiner* — Hung T Vy
(74) *Attorney, Agent, or Firm* — Davis Wright Tremaine LLP

(57) ABSTRACT

The relative health of data storage drives may be determined based, at least in some aspects, on data access information and/or other drive operation information. In some examples, upon receiving the operation information from a computing device, a health level of a drive may be determined. The health level determination may be based at least in part on operating information received from a client entity. Additionally, a storage space allocation instruction or operation may be determined for execution. The allocation instruction or operation determined to be performed may be based at least in part on the determined health level.

18 Claims, 15 Drawing Sheets

(56) References Cited

U.S. PATENT DOCUMENTS

| | | |
|---|---|---|
| 6,249,887 B1 | 6/2001 | Gray et al. |
| 6,332,181 B1 | 12/2001 | Bossen et al. |
| 6,351,789 B1 | 2/2002 | Green |
| 6,370,520 B1 | 4/2002 | Ruutu et al. |
| 6,493,656 B1 | 12/2002 | Houston et al. |
| 6,640,327 B1 | 10/2003 | Hallberg |
| 6,725,321 B1 | 4/2004 | Sinclair et al. |
| 6,941,494 B1 | 9/2005 | Andreev et al. |
| 6,980,381 B2 | 12/2005 | Gray et al. |
| 7,009,536 B1 | 3/2006 | Gaus |
| 7,363,543 B2 | 4/2008 | Peebles et al. |
| 8,069,370 B1 | 11/2011 | Li et al. |
| 8,174,857 B1 | 5/2012 | Sommer et al. |
| 8,397,131 B1 | 3/2013 | Sommer et al. |
| 8,539,311 B2 | 9/2013 | Steiner et al. |
| 8,719,320 B1 | 5/2014 | Brooker et al. |
| 9,037,921 B1* | 5/2015 | Brooker ............... G06F 12/02 369/53.1 |
| 9,246,996 B1* | 1/2016 | Brooker ............. H04L 67/1008 |
| 9,503,517 B1* | 11/2016 | Tajima ............... H04L 67/1008 |
| 9,606,914 B2* | 3/2017 | Thatcher ............ G06F 12/0246 |
| 2002/0040419 A1 | 4/2002 | Nishikawa et al. |
| 2002/0049886 A1 | 4/2002 | Furuya et al. |
| 2002/0190868 A1 | 12/2002 | Dearborn et al. |
| 2003/0051197 A1 | 3/2003 | Evans |
| 2003/0120751 A1 | 6/2003 | Husain et al. |
| 2003/0145297 A1 | 7/2003 | Cote et al. |
| 2003/0204789 A1* | 10/2003 | Peebles ............... G06F 11/0715 714/47.2 |
| 2003/0206470 A1 | 11/2003 | Leader et al. |
| 2003/0212643 A1 | 11/2003 | Steele et al. |
| 2004/0117476 A1 | 6/2004 | Steele et al. |
| 2004/0190183 A1 | 9/2004 | Tamai et al. |
| 2004/0208097 A1 | 10/2004 | Kim et al. |
| 2004/0210803 A1 | 10/2004 | Cheng et al. |
| 2004/0260967 A1 | 12/2004 | Guha et al. |
| 2005/0066230 A1 | 3/2005 | Bean et al. |
| 2005/0091561 A1 | 4/2005 | Lee |
| 2005/0097393 A1 | 5/2005 | de Brebisson et al. |
| 2005/0097406 A1 | 5/2005 | Brebisson |
| 2006/0031708 A1 | 2/2006 | Desai |
| 2006/0129875 A1 | 6/2006 | Barrall |
| 2006/0212755 A1 | 9/2006 | Urmanov |
| 2006/0236061 A1* | 10/2006 | Koclanes ............... G06F 3/0605 711/170 |
| 2007/0079170 A1 | 4/2007 | Zimmer et al. |
| 2007/0174720 A1 | 7/2007 | Kubo et al. |
| 2008/0016293 A1 | 1/2008 | Saika |
| 2008/0034084 A1 | 2/2008 | Pandya |
| 2009/0077434 A1 | 3/2009 | Furuhjelm et al. |
| 2009/0228519 A1 | 9/2009 | Purcell et al. |
| 2009/0271485 A1* | 10/2009 | Sawyer .................. G06F 3/061 709/206 |
| 2010/0011246 A1 | 1/2010 | Ly |
| 2010/0061207 A1 | 3/2010 | Trantham |
| 2010/0313072 A1 | 12/2010 | Suffern |
| 2010/0332889 A1* | 12/2010 | Shneorson ............ G06Q 10/06 714/2 |
| 2011/0131335 A1* | 6/2011 | Spaltro ................ G06F 9/5072 709/228 |
| 2011/0182119 A1 | 7/2011 | Strasser et al. |
| 2011/0231738 A1 | 9/2011 | Horisaki |
| 2011/0270795 A1* | 11/2011 | Smith .................. G06F 9/5011 706/52 |
| 2011/0296133 A1* | 12/2011 | Flynn ................. G06F 11/1048 711/171 |
| 2012/0203951 A1 | 8/2012 | Wood et al. |
| 2012/0272021 A1* | 10/2012 | Okada .................. G06F 3/0605 711/162 |
| 2013/0067188 A1 | 3/2013 | Mehra et al. |
| 2013/0212440 A1 | 8/2013 | Rom et al. |

OTHER PUBLICATIONS

U.S. Appl. No. 13/433,730, filed Mar. 29, 2012.
U.S. Appl. No. 13/433,658, filed Mar. 29, 2012.
U.S. Appl. No. 13/434,752, filed Mar. 29, 2012.

* cited by examiner

SERVER-SIDE, VARIABLE DRIVE HEALTH DETERMINATION

CROSS-REFERENCE TO RELATED APPLICATIONS

This application is a divisional of U.S. patent application Ser. No. 13/434,446, filed Mar. 29, 2012, entitled "SERVER-SIDE, VARIABLE DRIVE HEALTH DETERMINATION" which is incorporated herein by reference for all purposes. This application also incorporates by reference for all purposes the full disclosure of U.S. patent application Ser. No. 13/433,658, filed Mar. 29, 2012, entitled "CLIENT-SIDE, VARIABLE DRIVE HEALTH DETERMINATION", U.S. patent application Ser. No. 13/433,730, filed Mar. 29, 2012, entitled "VARIABLE DRIVE HEALTH DETERMINATION AND DATA PLACEMENT," and U.S. patent application Ser. No. 13/434,752, filed Mar. 29, 2012, entitled "VARIABLE DRIVE DIAGNOSTICS."

BACKGROUND

Providing Web and other interactive services, such as data storage, Web hosting, and the like, often involves providing remote server access in a distributed system. For instance, a customer may request that storage, input, and/or output operations be performed on customer provided data that is stored on one or more disks, or other media, located on one or more servers, potentially in different locations. Additionally, some customers may request differing performance parameters for different data and/or some data or services, by their very nature, may dictate differing performance parameters. For example, customers may request that data that is accessed often and/or data that should be processed more quickly be stored on servers, or at least storage space, with higher performance abilities or higher health levels. However, data storage space may not always maintain its original health levels. For example, some media may degrade over time or may become corrupt. As such, finding ways to determine drive health, detect drive failure, and determine data placement continues to be a priority.

BRIEF DESCRIPTION OF THE DRAWINGS

The detailed description is set forth with reference to the accompanying figures. In the figures, the left-most digit of a reference number identifies the figure in which the reference number first appears. The use of the same reference numbers in different figures indicates similar or identical items.

DETAILED DESCRIPTION

Figure 1:
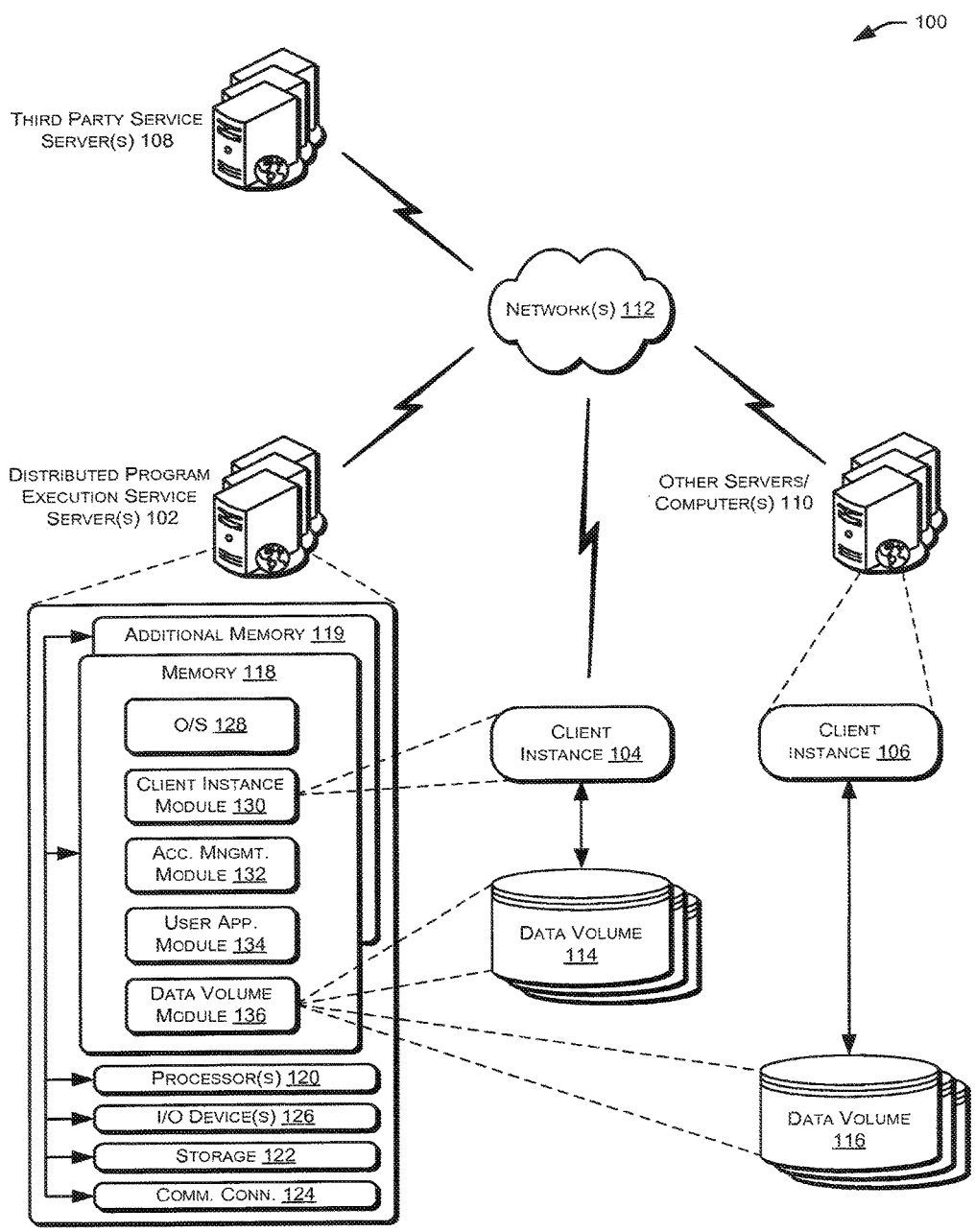
FIG. 1 illustrates an example architecture for implementing drive health determination and data placement, according to at least one example.

In the following description, various embodiments will be described. For purposes of explanation, specific configurations and details are set forth in order to provide a thorough understanding of the embodiments. However, it will also be apparent to one skilled in the art that the embodiments may be practiced without the specific details. Furthermore, well-known features may be omitted or simplified in order not to obscure the embodiment being described.

Embodiments of the present disclosure are directed to, among other things, detecting memory drive failures (e.g., determining drive health), making data placement decisions based at least in part on detected or potential failures, and/or performing diagnostic tests on suspect memory drives. As an overview, a distributed computing system may provide storage and/or processing capabilities over one or more servers, storage devices, or other computing devices connected via one or more networks. These storage and/or processing capabilities may be provided to customers and may, in some cases, include a client entity performing input/output (I/O) operations, on behalf of the customer, on one or more storage systems. In some examples, the client entity may process the data and/or instructions received via the I/O operations. Additionally, in some aspects, the client entity may reside on, or be hosted by, a server that also hosts the storage system. However, in other examples, the client entity may be in communication with one or more remote servers or computing devices that host the storage system. Further, in some aspects, the client entity may be a virtual machine instance operated by a host computing device on behalf of a customer and/or the storage system may be a virtual memory system hosted by one or more network servers. As such, the client entity may be virtually attached to one or more virtual servers for implementing a Web service, a distributed program execution service, and/or a remote storage service (e.g., cloud storage).

Additionally, in some examples, drive health determination, failure detection, and data placement may include determining, based at least in part on operational factors, parameters, inputs, outputs, latency, or other information associated with the distributed system, the relative health of storage space on the one or more network storage devices. For example, a server or other computing system may host or otherwise support one or more processors, storage drives, network interfaces, and/or peripheral I/O devices. That is, as described herein, a server may include the processors that host a virtual client instance on behalf of a customer or other entity, the drives (i.e., storage devices, locations, etc.) that store the data being processed by or for the client entities (or the server itself), and/or I/O devices for communicating the data between the client, other servers, other network devices, and/or other computing devices (e.g., a customer's computing device that accesses and/or interacts with the client instance and/or the Web service itself). As such, in some instances, a client entity may describe a customer's computing device that interacts with the distributed system described herein. While, in other instances, a client entity may describe a virtual machine running on behalf of the customer and/or hosted by the one or more computing devices (e.g., servers) of the distributed system. Additionally, in some examples when the client entity is implemented as a virtual instance hosted by the distributed system, the client entity may be hosted on the same or separate servers as the storage drives with which the client entity may interact.

In some aspects, regardless of the particular client/server and/or distributed configuration, operational performance information associated with processing, reading, and/or writing data to the one or more distributed servers may be received, collected, and/or processed to detect drive failure. For example, a client may receive or otherwise measure packet losses that occur during I/O operations associated with one or more servers. This information may then be utilized to determine the relative health of the server and/or the drive located on the server. For example, a higher number or rate of packet loss may indicate a lower health level of the server and/or drive. In this way, server and/or drive health may be described on a sliding scale (e.g., one, two, three, etc., levels of health) which may, in some cases, equate or be similar to a probability of failure of the server and/or drive. Drive health may also, or alternatively, include the ability of the server and/or drive to perform one or more operations associated with the drive and/or server. Additional performance criteria may include, but need not be limited to, read latencies, write latencies, particular faults, drive spin-up time, seek time, the number of attempts it takes to complete a read or write operation, the temperature of the server or drive, variance in read and/or write latencies, overall behavior variance, and/or any other factor that may indicate less than optimal operation of the drive. A determination may then be made as to whether the drive is healthy, failing, about to fail, or has already failed. That is, among other levels, the client, the server, and/or a third-party drive failure detection service may classify a drive as healthy, suspect (i.e., potentially unhealthy), or unhealthy.

As noted above, in some aspects, the determination may be made by the client, the server, and/or a third-party. For example, data may be collected by the client entity as it interacts with the one or more servers of the distributed system. However, the collected performance information may be sent to a server of the distributed system (e.g., a control plane server, the server hosting the one or more drives interacting with the client, and/or other servers) or a third-party service. In this way, the client may perform the relative health determination and/or drive failure detection and transmit the results to the server and/or the third-party service. Alternatively, or in addition, the client may collect the performance information and, independent of whether it performs any determinations, may transmit the information to the distributed system. Still, as desired, the client may transmit the collected performance data to one or more third-party services that may process the information to determine relative drive health and/or to detect drive failure. In some aspects, when the client or third-party service determines the relative drive health and/or detects the potential drive failure, the determination may be provided to a server of the distributed system. In this way, appropriate actions such as, but not limited to, moving data, reallocating storage space, decommissioning storage space, performing diagnostic tests, and/or performing rehabilitation operations, may be taken by the server.

In some examples, drive failure detection itself may include determining a health level of a storage drive. That is, when it is determined that a drive is unhealthy, this determination may indicate that the drive has failed or that there exists a high probability of failure. In this case, the server may decide to move data stored therein to a healthier drive, de-allocate space on the drive such that no additional data can be stored therein, and/or perform diagnostic tests or rehabilitation regimes. Additionally, when it is determined that a drive is suspect, this determination may indicate a lower probability of failure than a drive that is unhealthy; however, there may still be a relatively high probability of failure. In this case, if too much backup data is stored on a suspect drive, some or all of the data may be moved and/or the drive may be marked such that no new data is stored thereon. As desired, in some examples, these actions may be customizable by an operator or by the customer. That is, a customer may request that only a certain percentage of their data be stored on (or backed-up onto) suspect drives. Alternatively, or in addition, determinations to move data to healthier drives may be based at least in part on a frequency and/or type of I/O request that is common and/or expected for the data in question. Further, in some aspects, when it is determined that a drive is healthy, this determination may indicate that there is a relatively low probability that the drive may fail. In this case, the drive may at least be marked such that the server can store new data therein and/or move data from unhealthy and/or suspect drives thereto.

This brief introduction, including section titles and corresponding summaries, is provided for the reader's convenience and is not intended to limit the scope of the claims, nor the proceeding sections. Furthermore, the techniques described above and below may be implemented in a number of ways and in a number of contexts. Several example implementations and contexts are provided with reference to the following figures, as described below in more detail. However, the following implementations and contexts are but a few of many.

Illustrative Architectures

FIG. 1 illustrates aspects of an example architecture 100 in which techniques for drive health determination and data placement may be implemented. In architecture 100, one or more computing device (e.g., servers) of a distributed program execution service 102 (hereinafter, "distributed program execution service 102," "server 102," and/or "distributed servers 102") may interact or otherwise communicate with one or more client instances (or entities) 104, 106, one or more third-party computers 108, and/or one or more other servers 110 via one or more networks 112. The networks 112 may include any one or a combination of multiple different types of networks, such as cable networks, the Internet, wireless networks, and other private and/or public networks. In some examples, as noted above, a client entity such as client instances 104, 106 may be attached to one or more storage drives such as, but not limited to, data volumes 114, 116. In some examples, a client instance 104 may be physically attached to a data volume 114, such as when both the client instance 104 and the data volume 114 are located on the same server. However, in other examples, a client instance 106 may be virtually attached to a data volume 116, such as when the client instance 106 and the data volume 116 are located on separate servers and/or separate memory devices of the same server. As described herein, in at least some examples, a data volume, drive, or other memory store may also, or alternatively, be attached (or operationally attached) by way of generating and/or updating a read/write cache or memory mapping such that the data volume, drive, or other memory store is accessible and/or controllable.

Additionally, in some examples, a client instance 104 may receive and/or collect operational information associated with interaction with a data volume 114. For example, operational information may include read and/or write latencies, drive faults, packet loss, spin-up time, seek time, a number of attempts to complete a read or write operation, a temperature, overall behavior variance, combinations of the foregoing, or the like. This operational information may then be utilized to detect drive fault by determining server health and/or drive health. In some aspects, the client instance 104 may determine a drive health level for one or more data volumes 114, 116 based at least in part on the collected information. In this case, the client 104 may then transmit the determined health level to the distributed program execution service servers 102, the third-party service servers 108, and/or other servers 110 via the networks 112. In some examples, the client instance 104 may instead (or in addition) transmit the collected operational information to the distributed program execution service servers 102, the third-party service servers 108, and/or other servers 110 via the networks 112. In this case, the distributed program execution service servers 102, the third-party service servers 108, and/or other servers 110 may determine the drive health level based at least in part on the received operational information. Further, in some aspects, a client instance 104 may receive or collect operational information from more than one data volume (e.g., data volume 114 and data volume 116) and determine drive health (or transmit the information for determination by another entity) based at least in part on operational information differences between the two data volumes 114, 116.

In some aspects, one or more servers, perhaps arranged in a cluster or as a server farm, may host the distributed program execution service 102. Other server architectures may also be used to host the distributed servers 102. The distributed servers 102 are capable of handling requests from many customers and/or client entities such as, but not limited to, client instance 104 and processing, in response, various instructions, I/O operations, and/or processes.

In one illustrative configuration, the distributed servers 102 may include at least a memory 118 (and in some cases one or more additional memories 119) and one or more processing units (or processor(s)) 120. The processor(s) 120 may be implemented as appropriate in hardware, software, firmware, or combinations thereof. Software or firmware implementations of the processor(s) 120 may include computer-executable or machine-executable instructions written in any suitable programming language to perform the various functions described.

The memory 118 may store program instructions that are loadable and executable on the processor(s) 120, as well as data generated during the execution of these programs. Depending on the configuration and type of distributed servers 102, memory 118 may be volatile (such as random access memory (RAM)) and/or non-volatile (such as read-only memory (ROM), flash memory, etc.). The distributed servers 102 may also include additional storage 122 (e.g., removable storage and/or non-removable storage) including, but not limited to, magnetic storage, optical disks, and/or tape storage. The disk drives and their associated computer-readable media may provide non-volatile storage of computer-readable instructions, data structures, program modules, and other data for the computing devices. In some implementations, the memory 118 may include multiple different types of memory, such as static random access memory (SRAM), dynamic random access memory (DRAM), or ROM.

The memory 118, the removable storage and/or non-removable storage 122 are all examples of computer-readable storage media. For example, computer-readable storage media may include volatile and non-volatile, removable and non-removable media implemented in any method or technology for storage of information such as computer-readable instructions, data structures, program modules or other data.

Memory 118, removable storage and/or non-removable storage 122 are all examples of computer storage media. Additional types of computer storage media that may be present include, but are not limited to, programmable random access memory (PRAM), SRAM, DRAM, RAM, ROM, electrically erasable programmable read-only memory (EEPROM), flash memory or other memory technology, compact disk read-only memory (CD-ROM), digital versatile disks (DVD) or other optical storage, magnetic cassettes, magnetic tape, magnetic disk storage or other magnetic storage devices, or any other medium which can be used to store the desired information and which can be accessed by the distributed servers 102 or other computing devices. Combinations of the any of the above should also be included within the scope of computer-readable media.

Alternatively, computer-readable communication media may include computer-readable instructions, program modules, or other data transmitted within a data signal, such as a carrier wave, or other transmission. However, as used herein, computer-readable storage media does not include computer-readable communication media.

The distributed servers 102 may also contain communications connection(s) 124 that allow the distributed servers 102 to communicate with a stored database, another computing device or server, user terminals, and/or other devices on a network. The distributed servers 102 may also include I/O devices 126 including, but not limited to, input device(s) such as a keyboard, a mouse, a pen, a voice input device, a touch input device, etc., and/or output device(s) such as a display, speakers, printers, etc.

Turning to the contents of the memory 118 in more detail, the memory 118 may include an operating system 128 and one or more application programs or services for implementing the features disclosed herein including a client instance module 130, an account management module 132, a user application module 134, and/or a data volume module 136 (or additional data volume modules). Additionally, in some aspects, one or more additional memories, such as the additional memory 119 may represent the memory of a second storage server of the distributed program execution service servers 102 and may be configured to include the same or similar operating systems and/or application programs or services for implementing the features disclosed herein.

In some aspects, the account management module 132 may be configured to manage accounts for customers such as, but not limited to, Web sites and/or companies that utilize Web services of the distributed servers 102. In some cases, access to the account management module 132, by a customer or other entity, may be via the user application module 134 which, in some cases, may provide a user interface or other customer facing platform for interacting with the distributed servers 102. Additionally, in some aspects, the client instance module 130 may be configured to provide or host client entities on behalf of customers or other users of the distributed servers 102. Further, the data volume module 136 may be configured to host, control, or otherwise manage one or more data volumes 114, 116 of the distributed servers 102. In some examples, the dashed lines connecting the data volume module 136 and the data volumes 114, 116 may represent the data volume module's 136 capability to fetch data (e.g., block data) from the data volumes 114, 116 and present the volumes 114, 116 to the client instance 104. Additionally, as noted above, the data volumes 114, 116 may reside in the same or different memories as the client instances 104, 106. For example, in some cases, the client instance 104 may be stored in memory 118 while the data volumes 114, 116 may be stored in the memory 118 or in additional memory 119. That is, while it is shown the data volumes 114, 116 are part of the same storage server; in different configurations, the data volumes 114, 116 may be part of a second storage server. As desired, the memory 118 and the additional memory 119 may reside within the same server 102 or within one or more separate servers.

In at least one non-limiting example, a client instance 104 may collect information associated with the operation of an attached data volume 114. As noted above, this information may include performance information such as, but not limited to, read and/or write latencies. The client instance 104 may transmit this information to a server, such as the server 102 that controls the data volume 114. In some aspects, the server 102 may then determine a health level of the data volume based at least in part on the information received from the client instance 104. Further, in some instances, when it is determined that the health of the data volume 114 is below a predefined level, data stored on the data volume 114 may be moved to (or otherwise stored in) a second data volume 116. Upon moving the data (e.g., by taking a snapshot of the data from the data volume 114), the client instance 104 may be detached from the data volume 114 and subsequently attached to the data volume 116 (which now contains the data being utilized by the client instance 104).

Additionally, in some aspects, operational parameters associated with the data being utilized by the client instance 104 (e.g., performance preferences of the data attached via the data volume 114) may be received by the server 102. These parameters, in some examples, may be set by the customer and/or determined based at least in part on usage. In at least one example, it may be determined that the data volume 114 is within a suspect health level (e.g., with a 30% probability of failure) and that data in the volume 114 is labeled or otherwise marked as requesting performance above a certain level (e.g., the customer requests that the data only have a 5% chance of being lost). In this case, the server 102 may move the data to a second data volume with less than a 5% probability of failure and reallocate the data volume 114 such that only data with performance requests below a certain level (in this case, data that can handle a 30% chance of loss) may be stored there going forward. In other examples, however, operational parameters may be associated with read and/or write latency, or other performance criteria, as opposed to probability of failure. In this way, data volumes with lower latencies may be reallocated for data with higher speed demands and data that with low speed demands may be moved to data volumes with higher latencies.

In at least another non-limiting example, when it is determined that a data volume 114 is operating in a suspect level (i.e., relatively high failure probabilities, relatively high latencies, etc., but not so high that the volumes have failed or should be decommissioned), storage space in the data volume 114 may be decommissioned such that no additional data can be stored therein. That is, a memory controller may be updated to indicate that data should not be written to that data volume or location with the data volume. In this case, the data already stored therein may remain instead of being moved to another location; however, no new data may be added to the volume. Additionally, in this scenario, the data volume may be marked (e.g., by setting a flag) or otherwise indicated to be of suspect health. Further, when it is determined that the data volume 114 is unhealthy or has failed, data may be moved to healthier volumes, the space may be de-allocated such that no memory can be stored therein (i.e., the volume may be decommissioned), and the data volume 114 may be marked as unhealthy or failed. Again, in some examples, this may be implemented by setting a flag. However, other methods of indicating the volume as unhealthy are also acceptable.

Further, in at least one other non-limiting example, based at least in part on a determined health level of a data volume 114, a regime for performing diagnostics tests may be determined. In some aspects one or more tests may then be performed on the data volume 114. Additionally, based at least in part on the outcome of the diagnostics tests a rehabilitation regime may be generated. Further, based at least in part on the generated plan, rehabilitation operations (e.g., disk scrubbing) may be performed as part of the rehabilitation plan. In some examples, the diagnostic tests may be stored and run from the data volume 114 that is being tested. However, in other aspects, the diagnostic tests may be stored on the server 102 that houses or otherwise hosts the data volume 114. Additionally, in some aspects, storage space may first be reallocated to make room for the diagnostic tests prior to storing the diagnostic tests on the server and/or in the data volume 114. Further, in some examples, diagnostic tests and/or rehabilitation operations may be performed more frequently for less healthy data volumes and less frequently for healthier data volumes.

Figure 2:
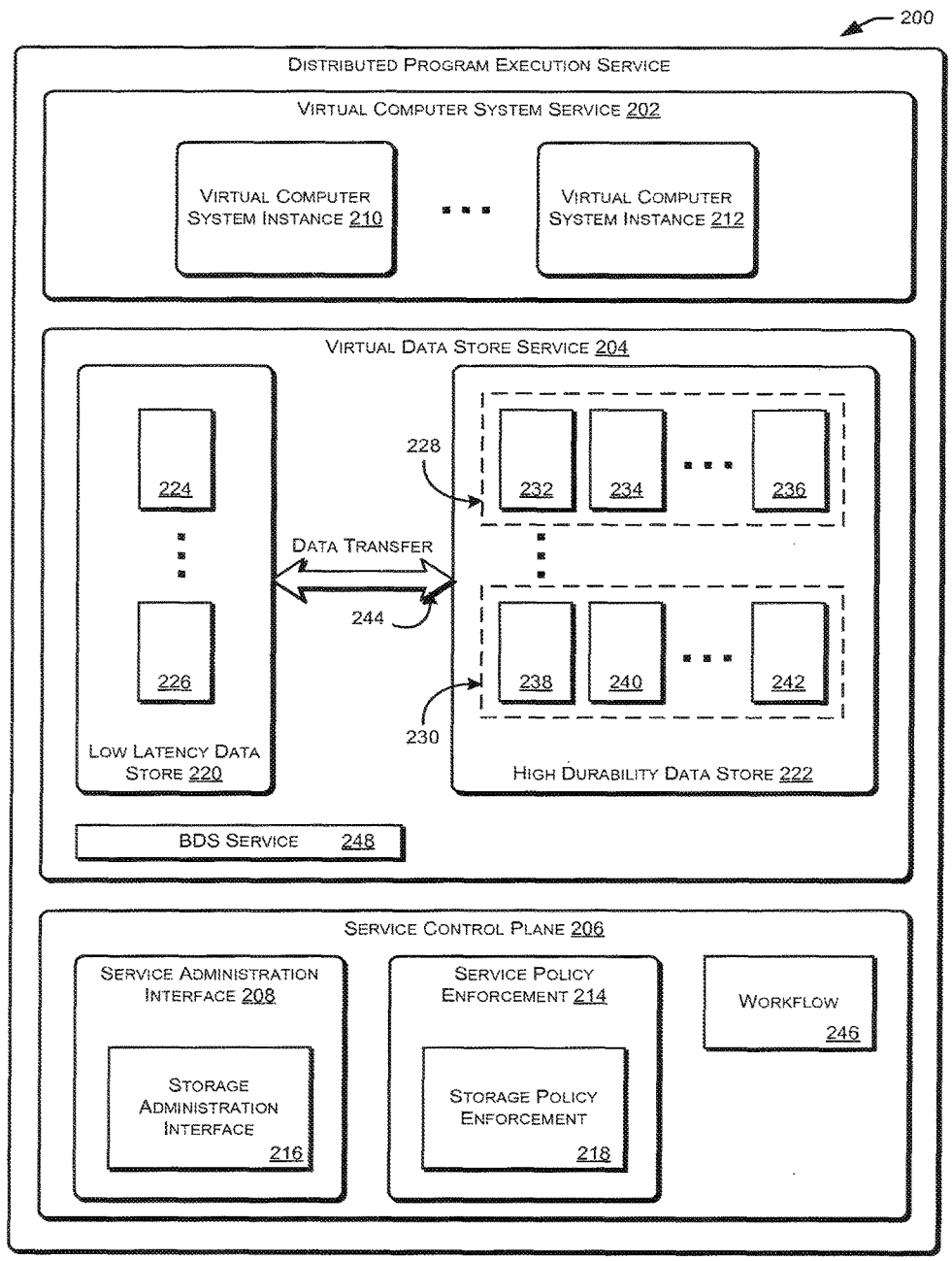
FIG. 2 illustrates an example architecture of a distributed program execution service that may be utilized to implement the drive health determination and data placement described herein, according to at least one example.

As noted, in at least one example, one or more aspects of the environment or architecture 100 may incorporate and/or be incorporated into a distributed program execution service such as that hosted by the distributed servers 102. FIG. 2 depicts aspects of an example distributed program execution service 200 in accordance with at least one example. The distributed program execution service 200 may provide virtualized computing services, including a virtual computer system service 202 and a virtual data store service 204, with a wide variety of computing resources interlinked by a relatively high speed data network. Such computing resources may include processors such as central processing units (CPUs), volatile storage devices such as RAM, non-volatile storage devices such as flash memory, hard drives and optical drives, servers such as the distributed program execution service servers 102 described above with reference to FIG. 1, one or more data stores such as the data volumes 114, 116 of FIG. 1, as well as communication bandwidth in the interlinking network. The computing resources managed by the distributed program execution service 200 are not shown explicitly in FIG. 2 because it is an aspect of the distributed program execution service 200 to emphasize an independence of the virtualized computing services from the computing resources that implement them.

The distributed program execution service 200 may utilize the computing resources to implement the virtualized computing services at least in part by executing one or more programs, program modules, program components, and/or programmatic objects (collectively, "program components") including and/or compiled from instructions and/or code specified with any suitable machine and/or programming language. For example, the computing resources may be allocated, and reallocated as necessary, to facilitate execution of the program components, and/or the program components may be assigned, and reassigned as necessary, to the computing resources. Such assignment may include physical relocation of program components, for example, to enhance execution efficiency. From a perspective of a user of the virtualized computing services, the distributed program execution service 200 may supply computing resources elastically and/or on-demand, for example, associated with a per resource unit commodity-style pricing plan.

The distributed program execution service 200 may further utilize the computing resources to implement a service control plane 206 configured at least to control the virtualized computing services. The service control plane 206 may include a service administration interface 208. The service administration interface 208 may include a Web-based user interface configured at least to enable users and/or administrators of the virtualized computing services to provision, de-provision, configure, and/or reconfigure (collectively, "provision") suitable aspects of the virtualized computing services. For example, a user of the virtual computer system service 202 may provision one or more virtual computer system instances 210, 212. The user may then configure the provisioned virtual computer system instances 210, 212 to execute the user's application programs. The ellipsis between the virtual computer system instances 210 and 212 (as well as with other ellipses throughout this disclosure) indicates that the virtual computer system service 202 may support any suitable number (e.g., thousands, millions, and more) of virtual computer system instances although, for clarity, only two are shown.

The service administration interface 208 may further enable users and/or administrators to specify and/or re-specify virtualized computing service policies. Such policies may be maintained and enforced by a service policy enforcement component 214 of the service control plane 206. For example, a storage administration interface 216 portion of the service administration interface 208 may be utilized by users and/or administrators of the virtual data store service 204 to specify virtual data store service policies to be maintained and enforced by a storage policy enforcement component 218 of the service policy enforcement component 214. Various aspects and/or facilities of the virtual computer system service 202 and the virtual data store service 204 including the virtual computer system instances 210, 212, the low latency data store 220, the high durability data store 222, and/or the underlying computing resources may be controlled with interfaces such as application programming interfaces (APIs) and/or Web-based service interfaces. In at least one example, the control plane 206 further includes a workflow component 246 configured at least to interact with and/or guide interaction with the interfaces of the various aspects and/or facilities of the virtual computer system service 202 and the virtual data store service 204 in accordance with one or more workflows.

In at least one embodiment, service administration interface 208 and/or the service policy enforcement component 214 may create, and/or cause the workflow component 246 to create, one or more workflows that are then maintained by the workflow component 246. Workflows, such as provisioning workflows and policy enforcement workflows, may include one or more sequences of tasks to be executed to perform a job, such as provisioning or policy enforcement. A workflow, as the term is used herein, is not the tasks themselves, but a task control structure that may control flow of information to and from tasks, as well as the order of execution of the tasks it controls. For example, a workflow may be considered a state machine that can manage and return the state of a process at any time during execution. Workflows may be created from workflow templates. For example, a provisioning workflow may be created from a provisioning workflow template configured with parameters by the service administration interface 208. As another example, a policy enforcement workflow may be created from a policy enforcement workflow template configured with parameters by the service policy enforcement component 214.

The workflow component 246 may modify, further specify and/or further configure established workflows. For example, the workflow component 246 may select particular computing resources of the distributed program execution service 200 to execute and/or be assigned to particular tasks. Such selection may be based at least in part on the computing resource needs of the particular task as assessed by the workflow component 246. As another example, the workflow component 246 may add additional and/or duplicate tasks to an established workflow and/or reconfigure information flow between tasks in the established workflow. Such modification of established workflows may be based at least in part on an execution efficiency analysis by the workflow component 246. For example, some tasks may be efficiently performed in parallel, while other tasks depend on the successful completion of previous tasks.

The virtual data store service 204 may include multiple types of virtual data stores such as a low latency data store 220 and a high durability data store 222. For example, the low latency data store 220 may maintain one or more data sets 224, 226 which may be read and/or written (collectively, "accessed") by the virtual computer system instances 210, 212 with relatively low latency. The ellipsis between the data sets 224 and 226 indicates that the low latency data store 220 may support any suitable number (e.g., thousands, millions, and more) of data sets although, for clarity, only two are shown. For each data set 224, 226 maintained by the low latency data store 220, the high durability data store 222 may maintain a set of captures 228, 230. Each set of captures 228, 230 may maintain any suitable number of captures 232, 234, 236 and 238, 240, 242 of its associated data set 224, 226, respectively, as indicated by the ellipses. Each capture 232, 234, 236 and 238, 240, 242 may provide a representation of the respective data set 224 and 226 at particular moment in time. Such captures 232, 234, 236 and 238, 240, 242 may be utilized for later inspection including restoration of the respective data set 224 and 226 to its state at the captured moment in time. Although each component of the distributed program execution service 200 may communicate utilizing the underlying network, data transfer 244 between the low latency data store 220 and the high durability data store 222 is highlighted in FIG. 2 because the contribution to utilization load on the underlying network by such data transfer 244 can be significant.

For example, the data sets 224, 226 of the low latency data store 220 may be virtual disk files (i.e., file(s) that can contain sequences of bytes that represents disk partitions and file systems) or other logical volumes. The low latency data store 220 may include a low overhead virtualization layer providing access to underlying data storage hardware. For example, the virtualization layer of the low latency data store 220 may be low overhead relative to an equivalent layer of the high durability data store 222. Systems and methods for establishing and maintaining low latency data stores and high durability data stores in accordance with at least one embodiment are known to those of skill in the art, so only some of their features are highlighted herein. In at least one embodiment, the sets of underlying computing resources allocated to the low latency data store 220 and the high durability data store 222, respectively, are substantially disjoint. In a specific embodiment, the low latency data store 220 could be a Storage Area Network (SAN) target or the like. In this exemplary embodiment, the physical computer system that hosts the virtual computer system instance 210, 212 can send read/write requests to the SAN target.

The low latency data store 220 and/or the high durability data store 222 may be considered non-local and/or independent with respect to the virtual computer system instances 210, 212. For example, physical servers implementing the virtual computer system service 202 may include local storage facilities such as hard drives. Such local storage facilities may be relatively low latency but limited in other ways, for example, with respect to reliability, durability, size, throughput, and/or availability. Furthermore, data in local storage allocated to particular virtual computer system instances 210, 212 may have a validity lifetime corresponding to the virtual computer system instance 210, 212, so that if the virtual computer system instance 210, 212 fails or is de-provisioned, the local data is lost and/or becomes invalid. In at least one embodiment, data sets 224, 226 in non-local storage may be efficiently shared by multiple virtual computer system instances 210, 212. For example, the data sets 224, 226 may be mounted by the virtual computer system instances 210, 212 as virtual storage volumes.

Data stores in the virtual data store service 204, including the low latency data store 220 and/or the high durability data store 222, may be facilitated by and/or implemented with a block data storage (BDS) service 248, at least in part. The BDS service 248 may facilitate the creation, reading, updating and/or deletion of one or more block data storage volumes, such as virtual storage volumes, with a set of allocated computing resources including multiple block data storage servers. A block data storage volume, and/or the data blocks thereof, may be distributed and/or replicated across multiple block data storage servers to enhance volume reliability, latency, durability, and/or availability. As one example, the multiple server block data storage systems that store block data may in some embodiments be organized into one or more pools or other groups that each have multiple physical server storage systems co-located at a geographical location, such as in each of one or more geographically distributed data centers, and the program(s) that use a block data volume stored on a server block data storage system in a data center may execute on one or more other physical computing systems at that data center.

The BDS service 248 may facilitate and/or implement local caching of data blocks as they are transferred through the underlying computing resources of the distributed program execution service 200 including local caching at data store servers implementing the low latency data store 220 and/or the high durability data store 222, and local caching at virtual computer system servers implementing the virtual computer system service 202. In at least one embodiment, the high durability data store 222 is an archive quality data store implemented independent of the BDS service 248. The high durability data store 222 may work with sets of data that are large relative to the data blocks manipulated by the BDS service 248. The high durability data store 222 may be implemented independent of the BDS service 248. For example, with distinct interfaces, protocols, and/or storage formats.

Each data set 224, 226 may have a distinct pattern of change over time. For example, the data set 224 may have a higher rate of change than the data set 226. However, in at least one embodiment, bulk average rates of change insufficiently characterize data set change. For example, the rate of change of the data set 224, 226 may itself have a pattern that varies with respect to time of day, day of week, seasonally including expected bursts correlated with holidays and/or special events, and/or annually. Different portions of the data set 224, 226 may be associated with different rates of change, and each rate of change "signal" may itself be composed of independent signal sources, for example, detectable with Fourier analysis techniques. Any suitable statistical analysis techniques may be utilized to model data set change patterns including Markov modeling and Bayesian modeling.

As described above, an initial capture 232 of the data set 224 may involve a substantially full copy of the data set 224 and transfer 244 through the network to the high durability data store 222 (may be a "full capture"). In a specific example, this may include taking a snapshot of the blocks that make up a virtual storage volume. Data transferred between the low latency data store 220 and high durability data store 222 may be orchestrated by one or more processes of the BDS service 248. As another example, a virtual disk (storage volume) may be transferred to a physical computer hosting a virtual computer system instance 210. A hypervisor may generate a write log that describes the data and location where the virtual computer system instance 210 writes the data. The write log may then be stored by the high durability data store 222 along with an image of the virtual disk when it was sent to the physical computer.

The data set 224 may be associated with various kinds of metadata. Some, none or all of such metadata may be included in a capture 232, 234, 236 of the data set 224 depending on the type of the data set 224. For example, the low latency data store 220 may specify metadata to be included in a capture depending on its cost of reconstruction in a failure recovery scenario. Captures 234, 236 beyond the initial capture 232 may be "incremental," for example, involving a copy of changes to the data set 224 since one or more previous captures. Changes to a data set may also be recorded by a group of differencing virtual disks which each comprise a set of data blocks. Each differencing virtual disk may be a parent and/or child differencing disk. A child differencing disk may contain data blocks that are changed relative to a parent differencing disk. Captures 232, 234, 236 may be arranged in a hierarchy of classes, so that a particular capture may be incremental with respect to a sub-hierarchy of capture classes (e.g., a capture scheduled weekly may be redundant with respect to daily captures of the past week, but incremental with respect to the previous weekly capture). Depending on the frequency of subsequent captures 234, 236, utilization load on the underlying computing resources can be significantly less for incremental captures compared to full captures.

For example, a capture 232, 234, 236 of the data set 224 may include read access of a set of servers and/or storage devices implementing the low latency data store 220, as well as write access to update metadata, for example, to update a data structure tracking "dirty" data blocks of the data set 224. For the purposes of this description, data blocks of the data set 224 are dirty (with respect to a particular class and/or type of capture) if they have been changed since the most recent capture (of the same class and/or type). Prior to being transferred 244 from the low latency data store 220 to the high durability data store 222, capture 232, 234, 236 data may be compressed and/or encrypted by the set of servers. At the high durability data store 222, received capture 232, 234, 236 data may again be written to an underlying set of servers and/or storage devices. Thus each capture 232, 234, 236 involves a load on finite underlying computing resources including server load and network load. It should be noted that, while illustrative embodiments of the present disclosure discuss storage of captures in the high durability data store 222, captures may be stored in numerous ways. Captures may be stored in any data store capable of storing captures including, but not limited to, low-latency data stores and the same data stores that store the data being captured.

Captures 232, 234, 236 of the data set 224 may be manually requested, for example, utilizing the storage administration interface 216. In at least one embodiment, the captures 232, 234, 236 may be automatically scheduled in accordance with a data set capture policy. Data set capture policies in accordance with at least one embodiment may be specified with the storage administration interface 216, as well as associated with one or more particular data sets 224, 226. The data set capture policy may specify a fixed or flexible schedule for data set capture. Fixed data set capture schedules may specify captures at particular times of day, days of the week, months of the year, and/or any suitable time and date. Fixed data set capture schedules may include recurring captures (e.g., every weekday at midnight, every Friday at 2 am, 4 am every first of the month) as well as one-off captures.

Figure 3:
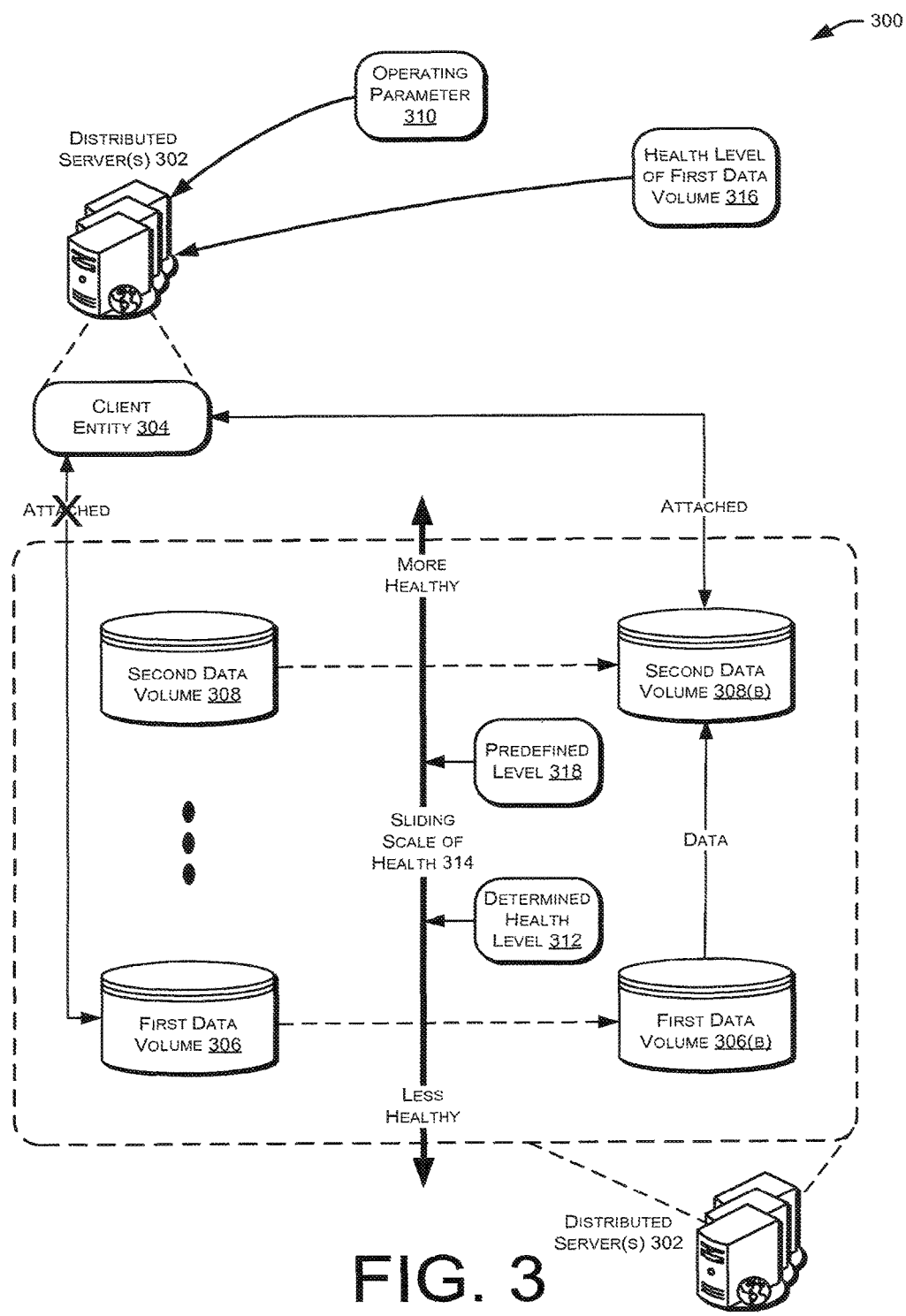
FIGS. 3-5 illustrate a few example block diagrams for describing at least some features of the drive health determination and data placement described herein, according to at least one example.

FIG. 3 depicts an example block diagram 300 illustrating aspects and/or features of the example architecture 100 of FIG. 1 in which techniques for drive health determination and data placement may be implemented. In the block diagram 300, aspects of the disclosure are shown again with reference to one or more distributed servers 302 such as, but not limited to, the distributed program execution service servers 102 of FIG. 1. In some aspects a client entity 304 may be stored within, or otherwise hosted (e.g., as described above with reference to virtual computer instances) by the one or more distributed servers 302. Similarly, one or more data volumes such as, but not limited to, the first data volume 306, the second data volume 308, and/or any other data volumes signified by the ellipses may be stored within a data store of the one or more distributed servers 302. In some aspects, at least the first data volume 306 may be attached (e.g., virtually attached) to the client entity 304. In this way, the client entity 304 may access the first data volume 306, performing or requesting storage management instruction operations such as, but not limited to, read requests, write requests, gets, puts, other I/O operations, or the like. Further, storage management instructions may include one or more instructions for controlling data placement including, but not limited to, storing data, moving data, reallocating storage space, securely deleting data, de-allocating storage space, and/or any other computer-executable instruction for managing the storage and/or placement of data.

In some examples, the distributed servers 302 may receive one or more operating parameters 310 associated with the client entity 304 accessing at least the first data volume 306. The operating parameters 310 may be received from the client entity 304, from a third-party server, or from some other server or computing device with access the operating parameters 310. Additionally, the operating parameters 310 may include software and/or mechanical performance indicators such as, but not limited to, read latencies, write latencies, differences between read and/or write latencies, packet loss data, spin-up time, seek time, a number of attempts it takes to complete a read or write operation, a temperature, an overall variance, a type of software being used, and/or an indication that a kernel or firmware operating on the distributed server 302 may be known to cause disk degradation.

In at least one non-limiting example, the distributed server 302 may determine, based at least in part on the received operating parameters 310, a health level 312 on a sliding scale of health 314. As shown in FIG. 3, the sliding scale of health 314 may describe an abstraction for indicating a health level out of many possible different levels. For example, there may exist at least three, five, ten, fifty, or more different discrete levels of health possible. Additionally, health levels may also be described or understood using multi-directional vectors and/or non-linear arrangements. Further, drives that are determined to be higher on the sliding scale of health 314 may be deemed healthier than drives that are determined to be lower. In some examples, the health level may indicate whether the drive is failing, may likely fail within a certain time period, or has already failed. Further, in some examples, the health level of the first data volume 316 may be determined by a third-party or other computing device and received by the distributed servers 302. The distributed servers 302 may then determine whether the determined health level 312 is above or below a predefined level of health 318. The predefined level of health 318 may be based at least in part on historical information, benchmarks, customer, and/or system settings.

In some examples, when it is determined that the health level 312 of the first data volume 306 is below the predefined level 318, the distributed servers 302 may cause certain data to be moved from the first data volume 306(b) to the second data volume 308(b). Additionally, it should be understood that the first data volume 306(b) may be the same device as the data volume 306, just at a later point in time. Similarly, the second data volume 308(b) may be the same device as the second data volume 308, just at a later point in time. As such, data of the first storage device 306(b) may be stored in the second data volume 308(b), the client entity 304 may be detached from the first data volume 306(b), and/or the client entity 304 may be attached to the second data volume 308(b) which now contains the data that was previously attached to the client entity 304. In this case, the data may be protected from corruption or loss by being moved to healthier storage. Further, in some examples, an indication that the health of the first data volume 306 is below the predefined level 318 may be stored.

Further, in some examples, upon receiving the operating parameters 310, the distributed servers 302 may determine a failure risk associated with the first data volume 306. That is, in some aspects, the health level may be viewed as a drive failure risk. For example, a lower risk of drive failure may be associated with a higher health level. Additionally, a higher drive failure risk may be associated with a lower level of health. Upon determining the failure risk of the first data volume 306, the distributed servers 302 may then store data of the first data volume 306(b) in the second data volume 308(b) when it is determined that the failure risk is above a predefined level. Similar to the predefined health level 318, the predefined risk level may be determined based at least in part on past access and/or interaction with the first data volume 306, based at least in part on historical data, based at least in part on benchmarks, and/or based at least in part on customizable settings. Further, in some aspects, the distributed servers 302 may determine an amount of collective data that is stored in the first data volume 306 and cause transmission of a request to store the collective data in the second data volume 308(b) when the amount of collective data is greater than a predefined percentage. In this way, if a data volume such as the data volume 306 is deemed to be suspect, or less than healthy, a customer, the client entity 304, and/or the servers 302 may decide how much (or what percentage) of the data, snapshots of the data, and/or other types of data backups should be stored on the suspect drive.

Figure 4:
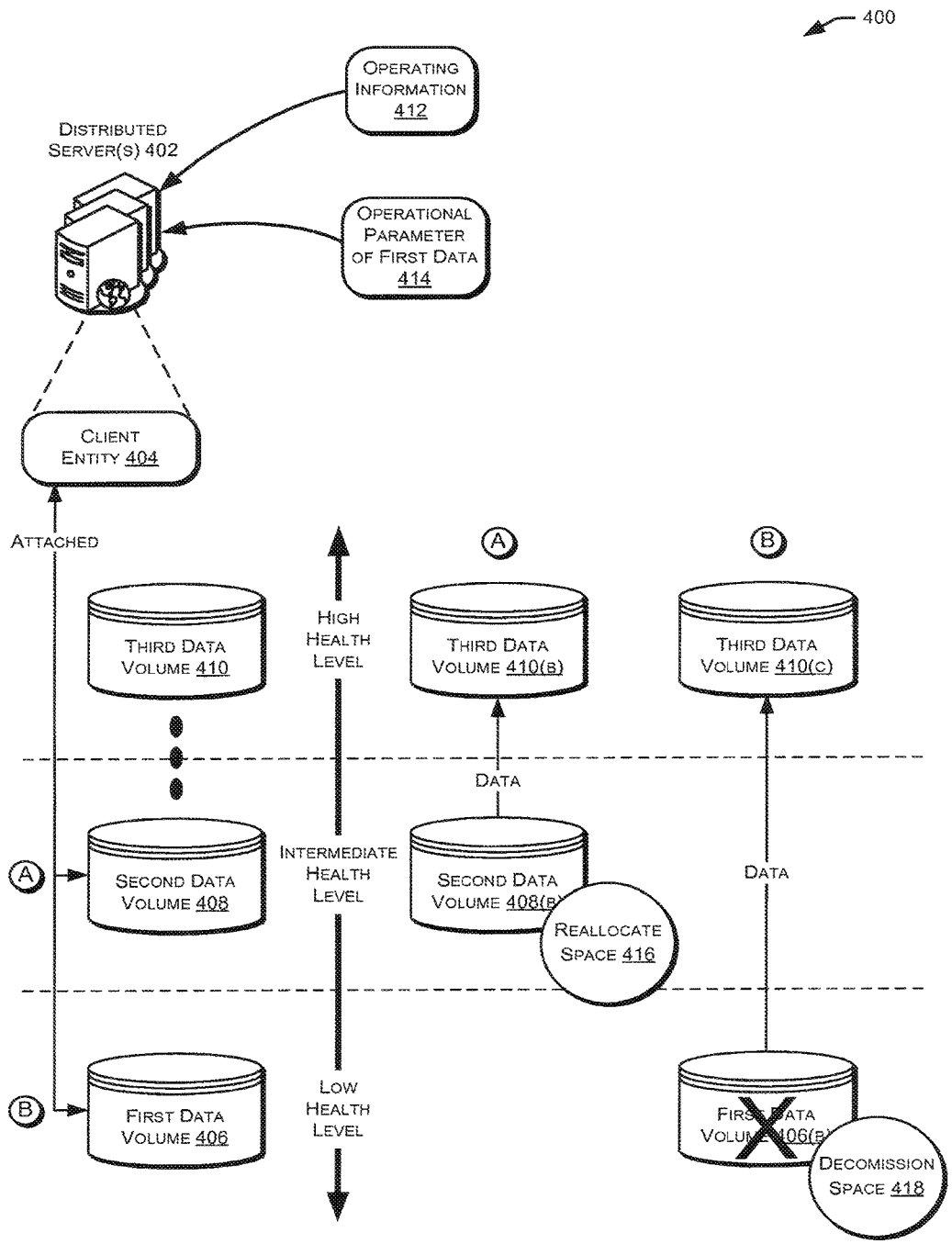

FIG. 4 depicts an example block diagram 400 illustrating additional aspects and/or features of the example architecture 100 of FIG. 1 in which techniques for drive health determination and data placement may be implemented. In the block diagram 400, aspects of the disclosure are shown again with reference to one or more distributed servers 402 such as, but not limited to, the distributed program execution service servers 102 of FIG. 1. Similar to FIG. 3, in some aspects a client entity 404 may be stored within, or otherwise hosted by the one or more distributed servers 402. Similarly, one or more data volumes such as, but not limited to, the first data volume 406, the second data volume 408, the third data volume 410, and/or any other data volumes signified by the ellipses may be stored within a data store of the one or more distributed servers 402. Further, in some aspects, at least the first data volume 406 and/or the second data volume 408 may be attached (e.g., virtually attached) to the client entity 404. In this way, the client entity 404 may access the first data volume 406 and/or the second data volume 408, performing read requests, write requests, gets, puts, other I/O operations, or the like.

In some examples, the distributed servers 402 may receive operating information 412 associated with the client entity 404 accessing at least the first and/or second data volumes 406, 408. The operating information 412 may be received from the client entity 404, from a third-party server, or from some other server or computing device with access to the operating information 412. Additionally, the operating information 412 may include software and/or mechanical performance indicators such as, but not limited to, read latencies, write latencies, differences between read and/or write latencies, packet loss data, spin-up time, seek time, a number of attempts it takes to complete a read or write operation, a temperature, an overall variance, a type of software being used, and/or an indication that a kernel or firmware operating on the distributed server 402 may be known to cause disk degradation. Additionally, in some aspects, the distributed servers 402 may also receive operational parameters 414 or preferences of at least a first amount of data. These operational parameters 414 or preferences may indicate read and/or write speed needs, reliability needs, performance needs, access needs, persistent needs, and/or security level needs. Additionally, they may indicate failure risk expectations of the data stored in the first and/or second data volumes 406, 408. That is, a customer or the client entity 404 may request that certain performance criteria be met for each data set. For example, some data may be accessed more often or may be deemed more important and, thus, the operational parameters 414 may be set accordingly.

In at least one non-limiting example, the distributed server 402 may determine, based at least in part on the received operating information 412, a health level on a sliding scale of health. Alternatively, or in addition, one more particular health levels may be defined. For example a high health level may indicate that the data volume 406, 408 is healthy (i.e., the volume has a relatively low probability of failure). An intermediate level may indicate that the data volume 406, 408 is suspect (i.e., the volume has a potential for failure and/or a probability of failure that is higher than that of the first level). Additionally, in some aspects, a low level may indicate that the data volume 406, 408 is unhealthy (i.e., the volume is failing, has failed, or has a relatively high probability that it may fail soon). Further, in some examples, the health level of the data volumes 406, 408 may be determined by a third-party or other computing device and received by the distributed servers 402. The distributed servers 402 may then determine whether the health of the data volumes 406, 408 is within the first, second, or third health level.

In some aspects, shown with reference to the "A" of FIG. 4, the second data volume 408 may be determined to be within the second health level. In this case, if any data stored therein that includes an operational parameter 414 indicating that the particular data does not belong in the second health level, the particular data may be moved from the second data volume 408(*b*) (the "b" here, signifying the same data volume 408, but at a later point in time) to the third data volume 410(*b*) with health within the first health level. Additionally, in this example, other data may be maintained while additional space of the second data volume 408(*b*) may be reallocated 416 such that only data with a specified operational parameter, that matches the performance and/or health of the second level, can be stored therein. In this way, once a volume is marked as suspect, important, high profile, and/or often requested data may be moved and only less important, lower profile, and/or less requested data may be stored therein in the future. The distribute servers 402 may also indicate or otherwise mark the second data volume 408(*b*) (e.g., by setting a flag) to indicate its level (in this case, the second or suspect health level) so that the client entity 404, the distributed servers 402, and/or any other servers may know the determined health of the data volume 408(*b*) without receiving operating information 412. As desired, however, if the distributed servers 402 later determine that the second data volume 408 has become healthy, by chance or due to cleaning, scrubbing, and/or other rehabilitation, the second data volume 408(*b*) may move to the first health level and the space may be reallocated 416 to once again store all types of data including that with higher operational parameter 414 needs.

In some aspects, shown with reference to the "B" of FIG. 4, the first data volume 406 may be determined to be within the third health level (i.e., this volume is unhealthy). In this case, if any data stored therein that includes an operational parameter 414 indicating that the particular data belongs in the first health level, the particular data may be moved from the first data volume 406(*b*) (the "b" here, signifying the same data volume 406, but at a later point in time) to the third data volume 410(*c*) with health within the first health level. Additionally, in this example, space of the first data volume 406(*b*) may be decommissioned 418 such that no additional data can be stored therein. In this way, once a volume is marked as unhealthy, all the data stored therein may be moved and no data may be stored therein in the future. The distribute servers 402 may also indicate or otherwise mark the first data volume 406(*b*) to indicate its level (in this case, the third or unhealthy level) so that the client entity 404, the distributed servers 402, and/or any other servers may know the determined health of the data volume 406(*b*) without receiving operating information 412. As desired, however, if the distributed servers 402 later determine that the second data volume 408 has become healthier, by chance or due to cleaning, scrubbing, and/or other rehabilitation, the first data volume 406(*b*) may move to the first health level and the space may be reallocated to once again store data. Additionally, in other examples, if any data stored in the first data volume includes an operational parameter 414 indicating that the particular data belongs in the second health level, the particular data may be moved from the first data volume 406(*b*) to the second data volume 408(*b*) with health within the second health level and/or from the first data volume 406(*b*) to the third data volume 410(*c*) with health within the first health level.

Figure 5:
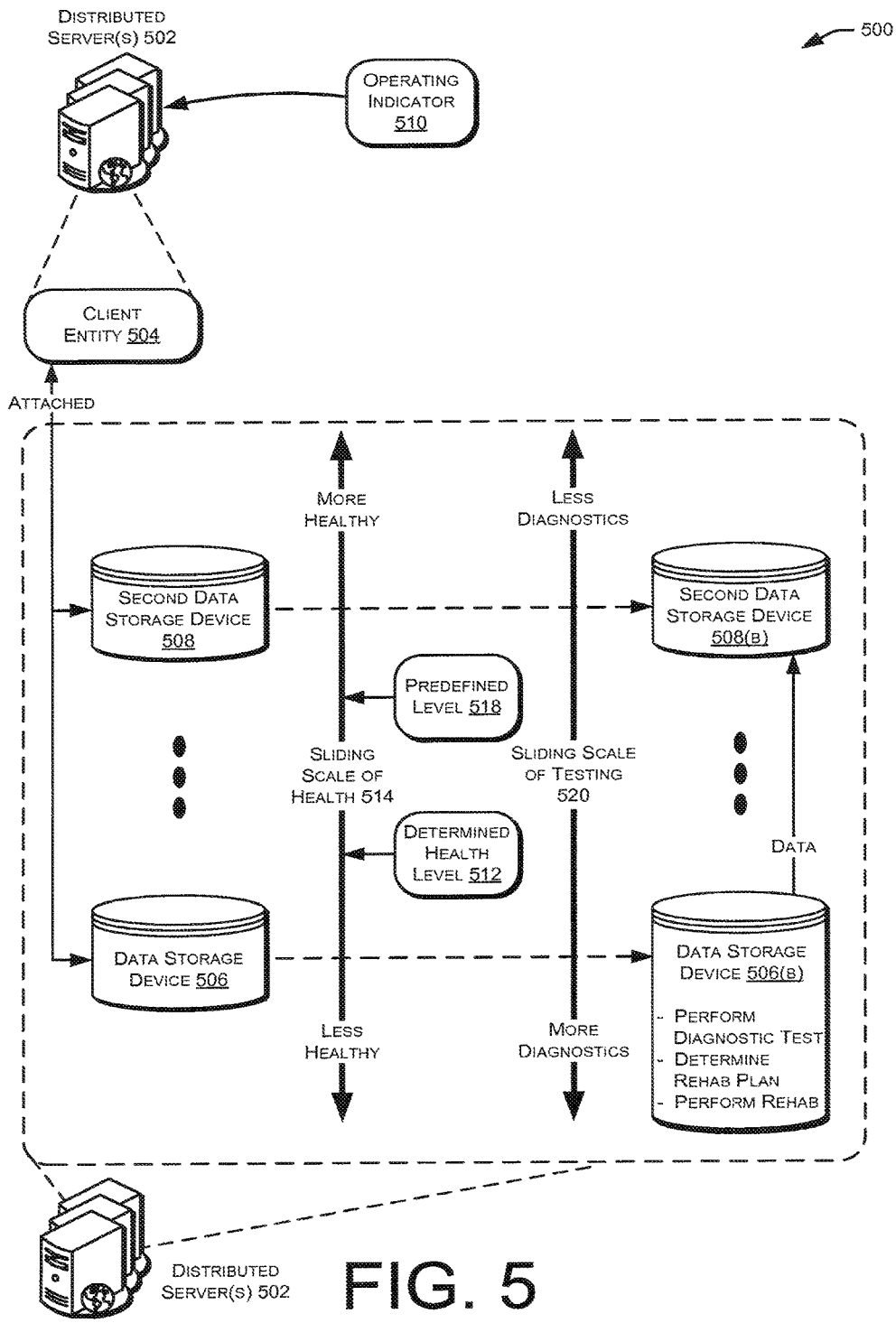

FIG. 5 depicts an example block diagram 500 illustrating additional aspects and/or features of the example architecture 100 of FIG. 1 in which techniques for drive health determination and data placement may be implemented. In the block diagram 500, aspects of the disclosure are shown again with reference to one or more distributed servers 502 such as, but not limited to, the distributed program execution service servers 102 of FIG. 1. Similar to FIGS. 3 and 4, in some aspects a client entity 504 may be stored within, or otherwise hosted by the one or more distributed servers 502. Similarly, one or more data storage devices such as, but not limited to, the first data storage device 506, the second data storage device 508, and/or any other data storage devices signified by the ellipses may be stored within a data store of the one or more distributed servers 502. Further, in some aspects, at least the first data storage device 506 and/or the second data storage device 508 may be attached (e.g., virtually attached) to the client entity 504. In this way, the client entity 504 may access the first data storage device 506 and/or the second data storage device 508, performing read requests, write requests, gets, puts, other I/O operations, or the like.

In some examples, the distributed servers 502 may receive operating information 510 associated with the client entity 504 accessing at least the first and/or second data storage devices 506, 508. The operating information 510 may be received from the client entity 504, from a third-party server, or from some other server or computing device with access to the operating information 510. Additionally, the operating information 510 may include software and/or mechanical performance indicators such as, but not limited to, read latencies, write latencies, differences between read and/or write latencies, packet loss data, spin-up time, seek time, a number of attempts it takes to complete a read or write operation, a temperature, an overall variance, a type of software being used, and/or an indication that a kernel or firmware operating on the distributed server 502 may be known to cause disk degradation.

The distributed servers 502 may determine, based at least in part on the received operating parameters 510, a health level 512 on a sliding scale of health 514. As shown in FIG. 5, the sliding scale of health 514 may describe an abstraction for indicating a health level out of many possible different levels. For example, there may exist at least three, five, ten, fifty, or more different discrete levels of health possible. As noted above, drives that are determined to be higher on the sliding scale of health 514 may be deemed healthier than drives that are determined to be lower. In some examples, the health level may indicate whether the drive is failing, may likely fail within a certain time period, or has already failed. Further, in some examples, the health level of the first or second data storage devices 506, 508 may be determined by a third-party or other computing device and received by the distributed servers 502. The distributed servers 502 may then determine whether the determined health level 512 is above or below a predefined level of health 518. The predefined level of health 518 may be based at least in part on historical information, benchmarks, customer, and/or system settings.

Additionally, in some examples, a sliding scale of testing 520 may be defined and/or implemented. The sliding scale of testing 520 may include, in some cases, diagnostic testing plans and/or rehabilitation plans. For example, on one end of the sliding scale of testing 520, the distributed servers 502 may perform a higher number of different tests and/or a higher frequency of tests. Similarly, at this end of the spectrum, the distributed serves 502 may perform a higher number of different rehabilitation operations and/or a higher frequency of rehabilitation operations. In some aspects, diagnostic tests and/or rehabilitation operations may include drive scanning, disk scrubbing, or the like. Further, in some aspects, based at least in part on the determined health level 512 of the data storage devices 506, 508, the distributed servers 502 may determine a level of testing and/or a level rehabilitation. For example, the servers 502 may request and/or perform fewer tests and/or rehabilitation operations on healthier volumes. Alternatively, for less healthy volumes, the servers 502 may perform more testing and/or more rehabilitation operations.

As noted above, the distributed serves 502 may determine the health level 512 of the first and/or second data storage devices 506, 508. Based at least in part on this determination, the servers 502 may then determine a diagnostic testing regime or plan. Once the appropriate diagnostic testing regime has been performed, the servers 502 may determine an appropriate rehabilitation plan. Rehabilitation operations may then be performed based at least in part on the plan. As noted above, in some examples, more diagnostics tests and/or more rehabilitation operations may be performed on data storage devices that are determined to be less healthy. Additionally, in one non-limiting example, the first data storage device 506 may be determined to be below a predefined level of health 518 while the second data storage device 508 may be determined to be above the predefined level of health 518. In this example, the servers 502 may cause data of the first data storage device 506(*b*) (again, here, the data storage device 506(*b*) is the data storage device 506 at a later point in time) to be stored in the second data storage device 508(*b*). Diagnostic testing may then be performed on the first data storage device 506(*b*), following by determining a rehabilitation plan, and performing rehabilitation operations. Further, in some examples, the diagnostic test and/or rehabilitation operation instructions may be stored in a data storage device of the distributed servers 502. In some instances, the instructions may be stored in the first and/or second data storage devices 506(*b*), 508(*b*). In this case, the servers 502 may reallocate space of the first data storage space 506(*b*) for storing the instructions after the data is moved to the second data storage device 508(*b*) to make room for the instructions.

Figure 6:
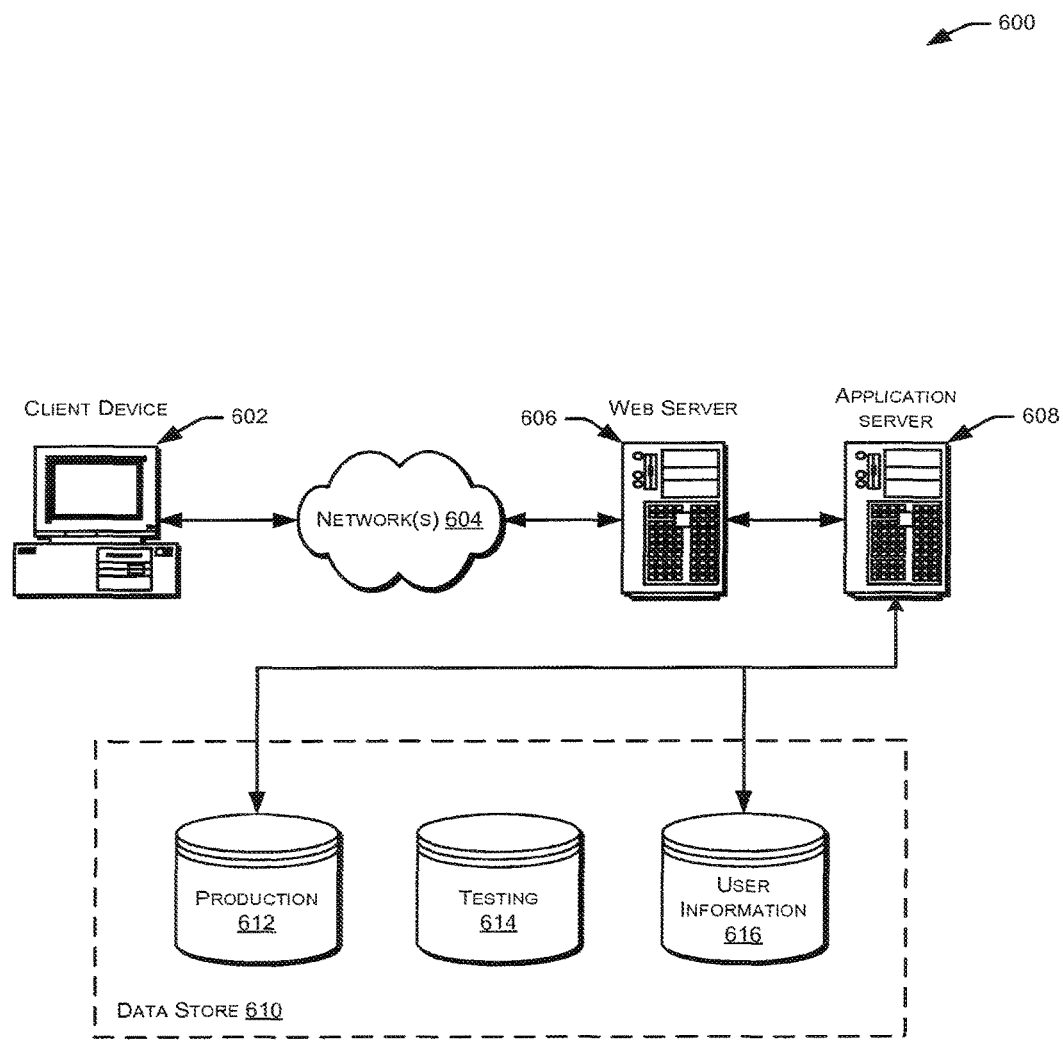
FIG. 6 illustrates an example block diagram of at least one environment in which various embodiments of features described herein can be implemented.

FIG. 6 illustrates aspects of an example environment 600 for implementing aspects in accordance with various embodiments. As will be appreciated, although a Web-based environment is used for purposes of explanation, different environments may be used, as appropriate, to implement various embodiments. The environment includes an electronic client device 602, which can include any appropriate device operable to send and receive requests, messages, or information over an appropriate network 604 and convey information back to a user of the device. Examples of such client devices include personal computers, cell phones, handheld messaging devices, laptop computers, set-top boxes, personal data assistants, electronic book readers, and the like. The network can include any appropriate network, including an intranet, the Internet, a cellular network, a local area network, or any other such network or combination thereof. Components used for such a system can depend at least in part upon the type of network and/or environment selected. Protocols and components for communicating via such a network are well known and will not be discussed herein in detail. Communication over the network can be enabled by wired or wireless connections, and combinations thereof. In this example, the network includes the Internet, as the environment includes a Web server 606 for receiving requests and serving content in response thereto, although for other networks an alternative device serving a similar purpose could be used as would be apparent to one of ordinary skill in the art.

The illustrative environment includes at least one application server 608 and a data store 610. It should be understood that there can be several application servers, layers, or other elements, processes, or components, which may be chained or otherwise configured, which can interact to perform tasks such as obtaining data from an appropriate data store. As used herein the term "data store" refers to any device or combination of devices capable of storing, accessing, and retrieving data, which may include any combination and number of data servers, databases, data storage devices, and data storage media, in any standard, distributed, or clustered environment. The application server can include any appropriate hardware and software for integrating with the data store as needed to execute aspects of one or more applications for the client device, handling a majority of the data access and business logic for an application. The application server provides access control services in cooperation with the data store, and is able to generate content such as text, graphics, audio, and/or video to be transferred to the user, which may be served to the user by the Web server in the form of HTML, XML, or another appropriate structured language in this example. The handling of all requests and responses, as well as the delivery of content between the client device 602 and the application server 608, can be handled by the Web server. It should be understood that the Web and application servers are not required and are merely example components, as structured code discussed herein can be executed on any appropriate device or host machine as discussed elsewhere herein.

The data store 610 can include several separate data tables, databases, or other data storage mechanisms and media for storing data relating to a particular aspect. For example, the data store illustrated includes mechanisms for storing production data 612 and user information 616, which can be used to serve content for the production side. The data store also is shown to include a mechanism for storing log data 614, which can be used for reporting, analysis, or other such purposes. It should be understood that there can be many other aspects that may need to be stored in the data store, such as for page image information and to access right information, which can be stored in any of the above listed mechanisms as appropriate or in additional mechanisms in the data store 610. The data store 610 is operable, through logic associated therewith, to receive instructions from the application server 608 and obtain, update, or otherwise process data in response thereto. In one example, a user might submit a search request for a certain type of item. In this case, the data store might access the user information to verify the identity of the user, and can access the catalog detail information to obtain information about items of that type. The information then can be returned to the user, such as in a results listing on a Web page that the user is able to view via a browser on the user device 602. Information for a particular item of interest can be viewed in a dedicated page or window of the browser.

Each server typically may include an operating system that provides executable program instructions for the general administration and operation of that server, and typically may include a computer-readable storage medium (e.g., a hard disk, random access memory, read only memory, etc.) storing instructions that, when executed by a processor of the server, allow the server to perform its intended functions. Suitable implementations for the operating system and general functionality of the servers are known or commercially available, and are readily implemented by persons having ordinary skill in the art, particularly in light of the disclosure herein.

The environment in one embodiment is a distributed computing environment utilizing several computer systems and components that are interconnected via communication links, using one or more computer networks or direct connections. However, it will be appreciated by those of ordinary skill in the art that such a system could operate equally well in a system having fewer or a greater number of components than are illustrated in FIG. 6. Thus, the depiction of the system 600 in FIG. 6 should be taken as being illustrative in nature, and not limiting to the scope of the disclosure.

The various embodiments further can be implemented in a wide variety of operating environments, which in some cases can include one or more user computers, computing devices, or processing devices which can be used to operate any of a number of applications. User or client devices can include any of a number of general purpose personal computers, such as desktop or laptop computers running a standard operating system, as well as cellular, wireless, and handheld devices running mobile software and capable of supporting a number of networking and messaging protocols. Such a system also can include a number of workstations running any of a variety of commercially-available operating systems and other known applications for purposes such as development and database management. These devices also can include other electronic devices, such as dummy terminals, thin-clients, gaming systems, and other devices capable of communicating via a network.

Most embodiments utilize at least one network that would be familiar to those skilled in the art for supporting communications using any of a variety of commercially-available protocols, such as TCP/IP, OSI, FTP, UPnP, NFS, CIFS, and AppleTalk. The network can be, for example, a local area network, a wide-area network, a virtual private network, the Internet, an intranet, an extranet, a public switched telephone network, an infrared network, a wireless network, and any combination thereof.

In embodiments utilizing a Web server, the Web server can run any of a variety of server or mid-tier applications, including HTTP servers, FTP servers, CGI servers, data servers, Java servers, and business application servers. The server(s) also may be capable of executing programs or scripts in response requests from user devices, such as by executing one or more Web applications that may be implemented as one or more scripts or programs written in any programming language, such as Java®, C, C# or C++, or any scripting language, such as Perl, Python, or TCL, as well as combinations thereof. The server(s) may also include database servers, including without limitation those commercially available from Oracle®, Microsoft®, Sybase®, and IBM®.

The environment can include a variety of data stores and other memory and storage media as discussed above. These can reside in a variety of locations, such as on a storage medium local to (and/or resident in) one or more of the computers or remote from any or all of the computers across the network. In a particular set of embodiments, the information may reside in a SAN familiar to those skilled in the art. Similarly, any necessary files for performing the functions attributed to the computers, servers, or other network devices may be stored locally and/or remotely, as appropriate. Where a system includes computerized devices, each such device can include hardware elements that may be electrically coupled via a bus, the elements including, for example, at least one CPU, at least one input device (e.g., a mouse, keyboard, controller, touch screen, or keypad), and at least one output device (e.g., a display device, printer, or speaker). Such a system may also include one or more storage devices, such as disk drives, optical storage devices, and solid-state storage devices such as RAM or ROM, as well as removable media devices, memory cards, flash cards, etc.

Such devices also can include a computer-readable storage media reader, a communications device (e.g., a modem, a network card (wireless or wired), an infrared communication device, etc.), and working memory as described above. The computer-readable storage media reader can be connected with, or configured to receive, a computer-readable storage medium, representing remote, local, fixed, and/or removable storage devices as well as storage media for temporarily and/or more permanently containing, storing, transmitting, and retrieving computer-readable information. The system and various devices also typically may include a number of software applications, modules, services, or other elements located within at least one working memory device, including an operating system and application programs, such as a client application or Web browser. It should be appreciated that alternate embodiments may have numerous variations from that described above. For example, customized hardware might also be used and/or particular elements might be implemented in hardware, software (including portable software, such as applets), or both. Further, connection to other computing devices such as network input/output devices may be employed.

Storage media and computer readable media for containing code, or portions of code, can include any appropriate media known or used in the art, including storage media and communication media, such as but not leveled to volatile and non-volatile, removable and non-removable media implemented in any method or technology for storage and/or transmission of information such as computer readable instructions, data structures, program modules, or other data, including RAM, ROM, EEPROM, flash memory or other memory technology, CD-ROM, digital versatile disk (DVD) or other optical storage, magnetic cassettes, magnetic tape, magnetic disk storage or other magnetic storage devices, or any other medium which can be used to store the desired information and which can be accessed by the a system device. Based on the disclosure and teachings provided herein, a person of ordinary skill in the art will appreciate other ways and/or methods to implement the various embodiments.

The specification and drawings are, accordingly, to be regarded in an illustrative rather than a restrictive sense. It will, however, be evident that various modifications and changes may be made thereunto without departing from the broader spirit and scope of the invention as set forth in the claims.

Other variations are within the spirit of the present disclosure. Thus, while the disclosed techniques are susceptible to various modifications and alternative constructions, certain illustrated embodiments thereof are shown in the drawings and have been described above in detail. It should be understood, however, that there is no intention to limit the invention to the specific form or forms disclosed, but on the contrary, the intention is to cover all modifications, alternative constructions, and equivalents falling within the spirit and scope of the invention, as defined in the appended claims.

The use of the terms "a," "an," "the," and similar referents in the context of describing the disclosed embodiments (especially in the context of the following claims) are to be construed to cover both the singular and the plural, unless otherwise indicated herein or clearly contradicted by context. The terms "comprising," "having," "including," and "containing" are to be construed as open-ended terms (i.e., meaning "including, but not limited to") unless otherwise noted. The term "connected" is to be construed as partly or wholly contained within, attached to, or joined together, even if there is something intervening. Recitation of ranges of values herein are merely intended to serve as a shorthand method of referring individually to each separate value falling within the range, unless otherwise indicated herein, and each separate value is incorporated into the specification as if it were individually recited herein. All methods described herein can be performed in any suitable order unless otherwise indicated herein or otherwise clearly contradicted by context. The use of any and all examples, or exemplary language (e.g., "such as") provided herein, is intended merely to better illuminate embodiments of the invention and does not pose a limitation on the scope of the invention unless otherwise claimed. No language in the specification should be construed as indicating any non-claimed element as essential to the practice of the invention.

Preferred embodiments of this disclosure are described herein, including the best mode known to the inventors for carrying out the invention. Variations of those preferred embodiments may become apparent to those of ordinary skill in the art upon reading the foregoing description. The inventors expect skilled artisans to employ such variations as appropriate, and the inventors intend for the invention to be practiced otherwise than as specifically described herein. Accordingly, this invention includes all modifications and equivalents of the subject matter recited in the claims appended hereto as permitted by applicable law. Moreover, any combination of the above-described elements in all possible variations thereof is encompassed by the invention unless otherwise indicated herein or otherwise clearly contradicted by context.

All references, including publications, patent applications, and patents, cited herein are hereby incorporated by reference to the same extent as if each reference were individually and specifically indicated to be incorporated by reference and were set forth in its entirety herein.

Further, the example architectures, tools, and computing devices shown in FIGS. 1-6 are provided by way of example only. Numerous other operating environments, system architectures, and device configurations are possible. Accordingly, embodiments of the present disclosure should not be construed as being limited to any particular operating environment, system architecture, or device configuration.

Illustrative Processes

Figure 7:
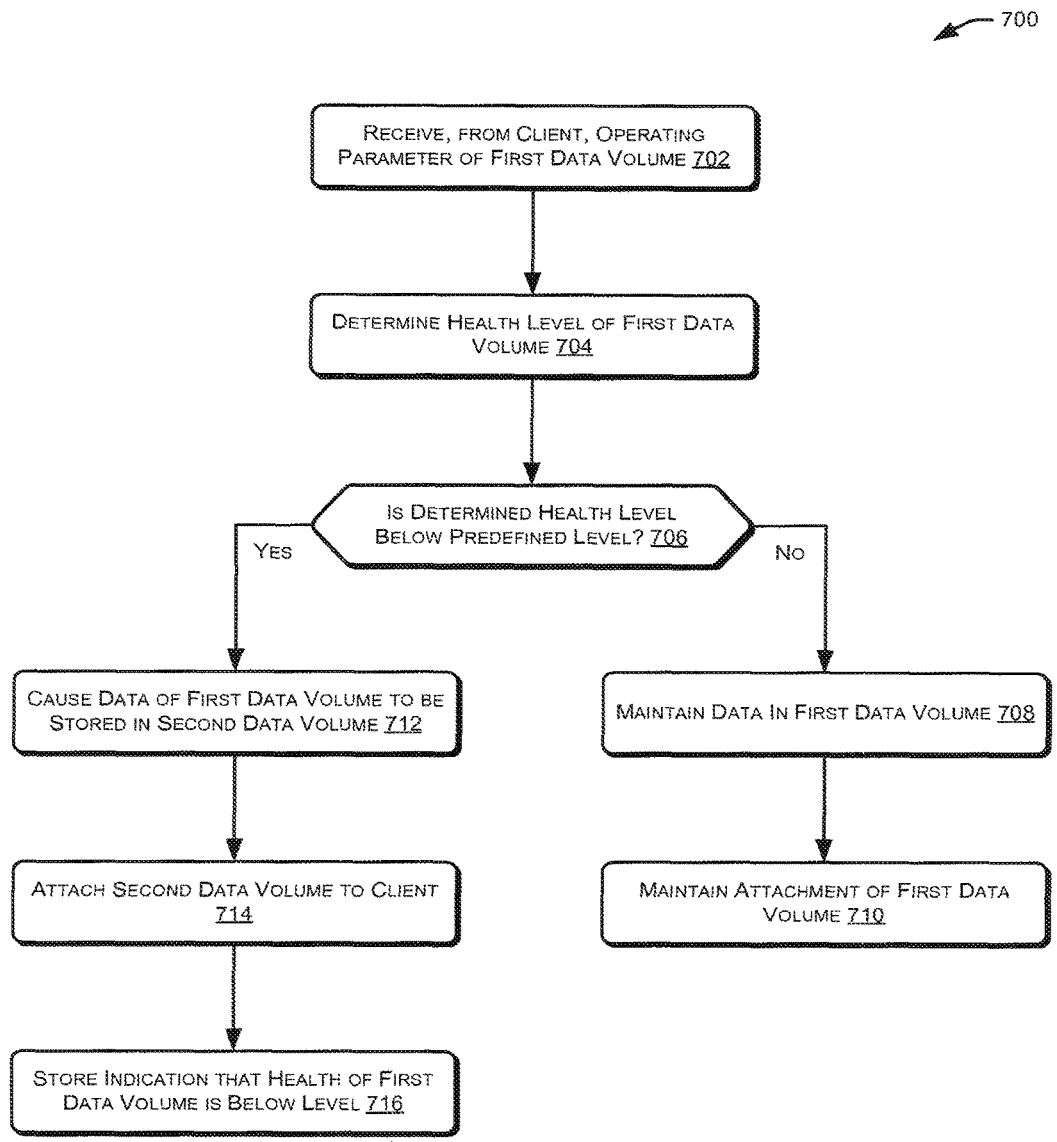
FIGS. 7-15 illustrate example flow diagrams of processes for implementing at least some features of the drive health determination and data placement described herein, according to at least a few examples.

FIG. 7 illustrates an example process 700 for implementing features of the example architecture 100 of FIG. 1 in which techniques for drive health determination and data placement may be implemented. Some or all of the process 700 (or any other processes described herein, or variations and/or combinations thereof) may be performed under the control of one or more computer systems configured with executable instructions and may be implemented as code (e.g., executable instructions, one or more computer programs, or one or more applications) executing collectively on one or more processors, by hardware, or combinations thereof. The code may be stored on a computer-readable storage medium, for example, in the form of a computer program comprising a plurality of instructions executable by one or more processors. The computer-readable storage medium may be non-transitory.

In some aspects, the process 700 may be performed by the one or more processors 120 of the distributed program execution service servers 102 shown in FIG. 1 and/or one or more processors of the one or more distributed servers 302 of FIG. 3. The process 700 may begin at 702 by receiving, from a client entity associated with the servers 102, an operating parameter of at least a first data volume. As noted above, the operating parameter may be associated with access or attempts to access, by the client entity, the data volume. In some examples, the process 700 may then determine, based at least in part on the received parameters, a health level of the first data volume at 704. At 706, the process 700 may determine whether the determined health level is below a predefined level. If the determined level is not below the predefined level, in some aspects, the process 700 may maintain the data stored in the first data volume at 708. The process 700 may then end at 710 by maintaining an attachment between the client entity and the first data volume. On the other hand, if the process 700 determines that the health level of the first data volume is below the predefined level at 706, the process may cause data of the first data volume to be stored in a second data volume at 712. That is, in this case, data of the first volume may be effectively moved to another storage device. At 714, the process may then attach the second data volume to the client entity and/or detach the first data volume from the client entity. The process 700 may then end at 716 by storing an indication that the health of the first data volume was determined to be below the predefined level. Further, in some cases, the determined health level of the first data volume may be recorded or otherwise indicated at 716.

Figure 8:
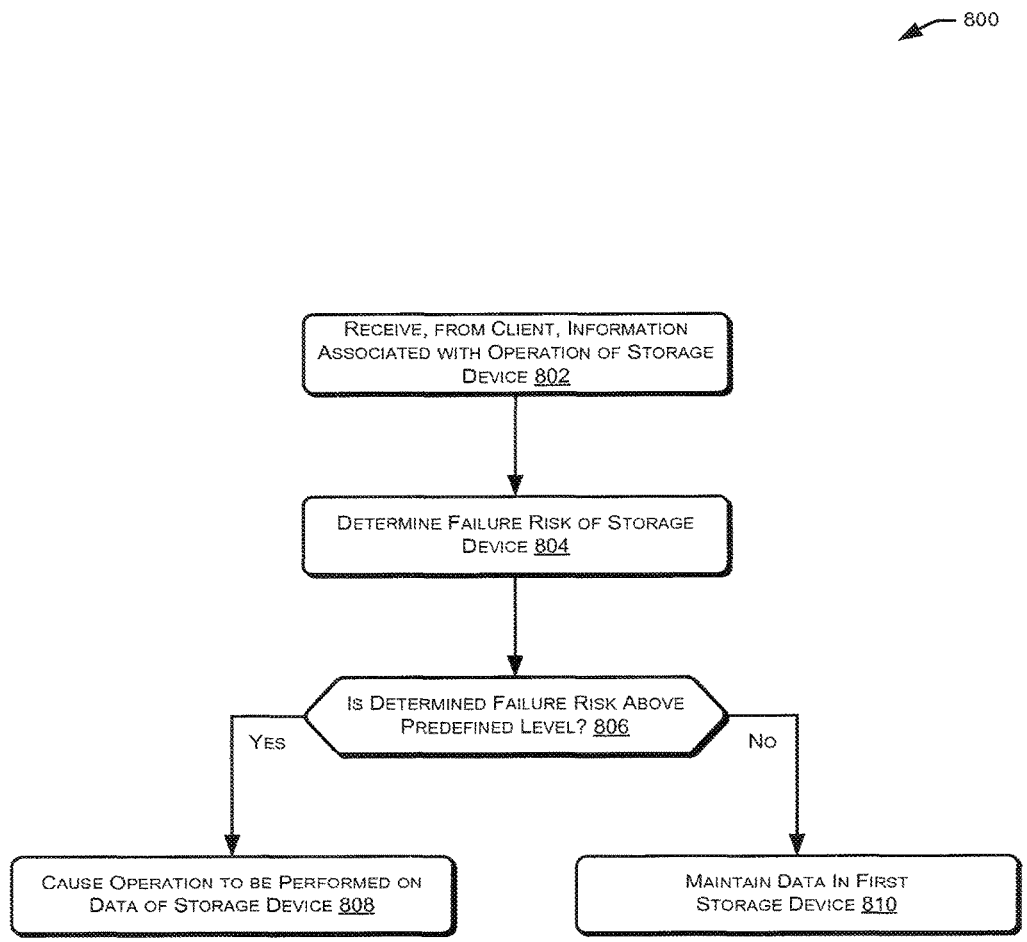

FIG. 8 illustrates an example process 800 for implementing additional features of the example architecture 100 of FIG. 1 in which techniques for drive health determination and data placement may be implemented. In some aspects, the process 800 may be performed by the one or more processors 120 of the distributed program execution service servers 102 shown in FIG. 1 and/or one or more processors of the one or more distributed servers 302 of FIG. 3. The process 800 may begin at 802 by receiving, from a client entity of the servers 102, information associated with operation of a first storage device. At 804, the process 800 may determine a failure risk of the first storage device. In some examples, a failure risk (or risk failure level) may be similar to a health level as described above. Based at least in part on the determined failure risk of the first data storage device, the process 800 may then determine whether the failure risk is above a predefined level of tolerated failure risk at 806. In some aspects, when the process 800 determines that the failure risk is above the predefined level, the process 800 may end by causing an operation to be performed on data of the first storage device at 808. In some aspects, the operation may include storing in (i.e., moving to) a second data storage device. Alternatively, when the process 800 determines at 806 that the determined failure risk is not above the predefined level, the process 800 may end at 810 by maintaining the data in the first storage device. In this case, the data may not be moved because the risk of failure of the data storage device is at a tolerable level for that data.

Figure 9:
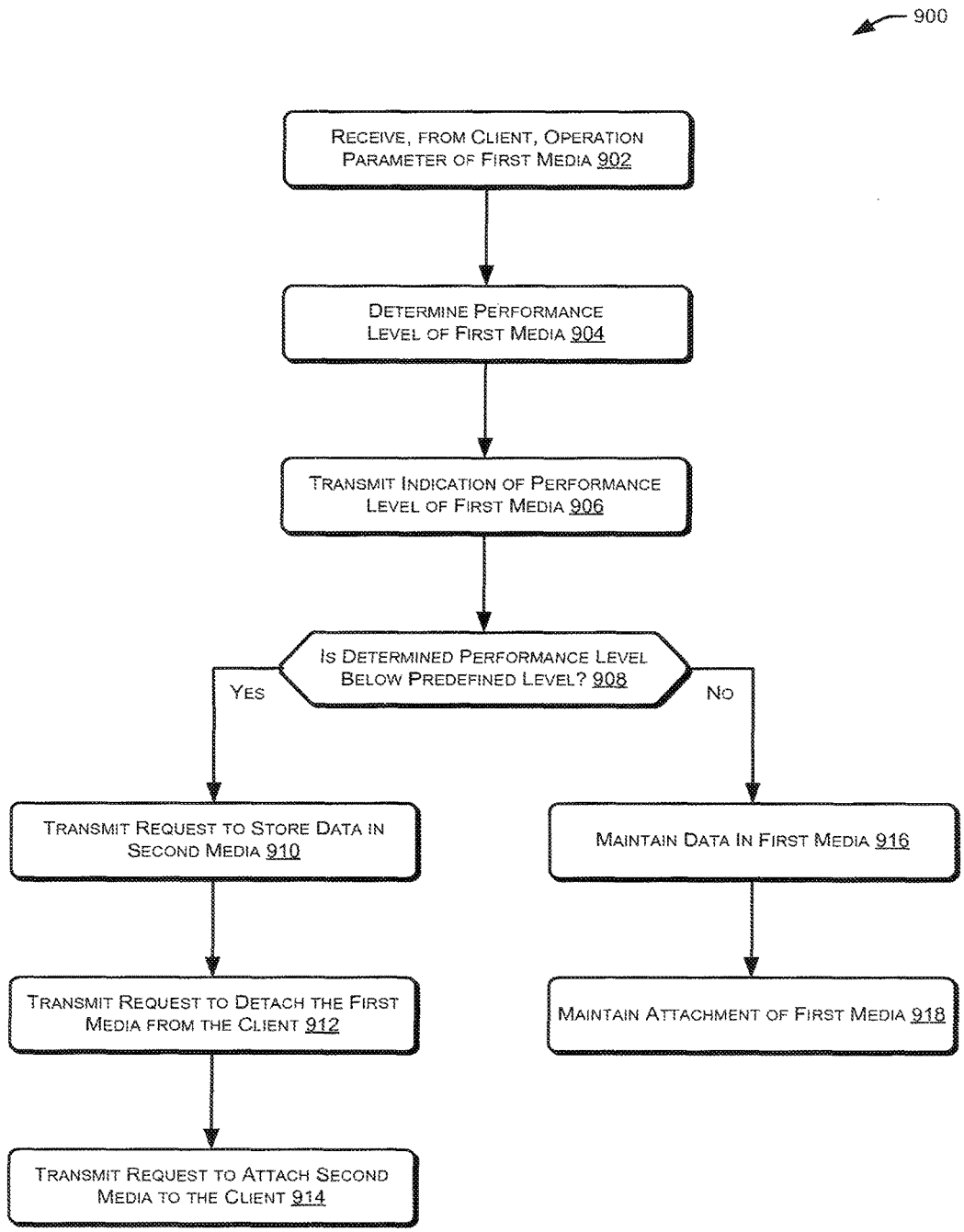

FIG. 9 illustrates an example process 900 for implementing additional features of the example architecture 100 of FIG. 1 in which techniques for drive health determination and data placement may be implemented. In some aspects, the process 900 may be performed by the one or more third party service servers 108 shown in FIG. 1. The process 900 may begin at 902 by receiving, from a client entity of the one or more distributed program execution service servers 102 of FIG. 1, an operation parameter of a first media. At 904, the process 900 may determine a performance level of the first media. In some examples, a performance level may be similar to a health level and/or a risk failure level as described above. However, in other examples, a performance level may include latency information, storage security information, and the like. Based at least in part on the determined performance level of the first media, the process 900 may then transmit an indication of the performance level at 906. The transmission of the performance level may, in some cases, be provided to the client entity and/or the distributed servers 102. At 908, the process 900 may determine whether the performance level is above a predefined level. In some aspects, when the process 900 determines that the performance level is above the predefined level, the process 900 may transmit a request (e.g., to the servers 102) to store data of the first media in a second media at 910. At 912, the process 900 may transmit a request to detach the first media from the client entity. The process 900 may then end at 914 by transmitting a request to attach the second media to the client entity. Alternatively, when the process 900 determines at 908 that the determined performance level is not above the predefined level, the process 900 may maintain the data in the first media at 916 and then end at 918 by maintaining the attachment between the client entity and the first media.

Figure 10:
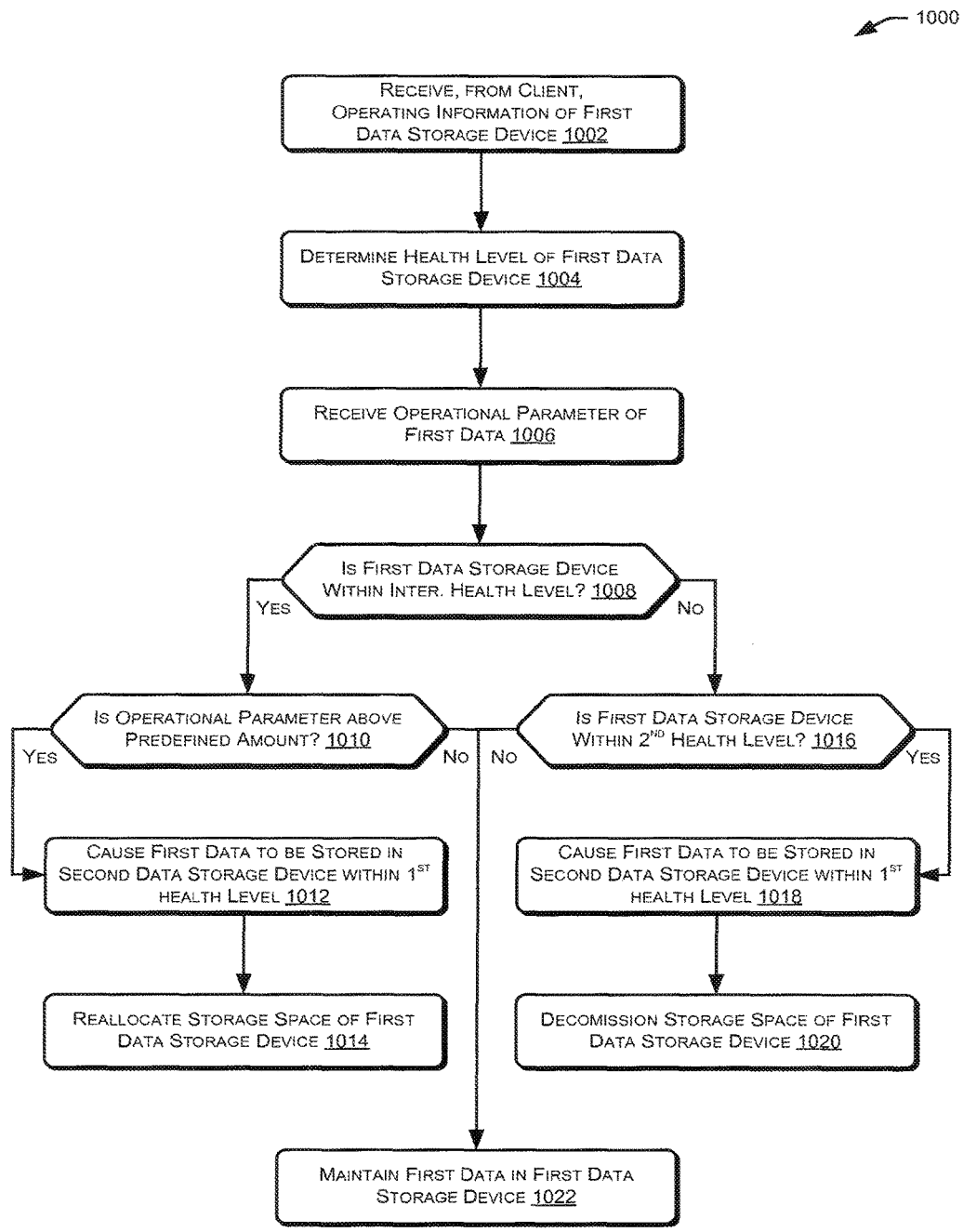

FIG. 10 illustrates an example process 1000 for implementing additional features of the example architecture 100 of FIG. 1 in which techniques for drive health determination and data placement may be implemented. In some aspects, the process 1000 may be performed by the distributed program execution service servers 102 shown in FIG. 1 and/or the distributed servers 402 of FIG. 4. The process 1000 may begin at 1002 by receiving, from a client entity of the one or more distributed program execution service servers 102 of FIG. 1, operation information of a first data storage device. At 1004, the process 1000 may determine a health level of the first data storage device. At 1006, the process 1000 may then receive an operational parameter associated with first data of the system. In some aspects, the operational parameter may indicate one or more performance preferences for the data. For example, a customer managing the data may request that the data be stored with extra redundancy, in a medium of high resiliency or low failure probability, with extra security, etc.

The process 1000 may then determine at 1008 whether the first data storage device is within an intermediate level (e.g., a suspect level that may be healthier than an unhealthy level but not as healthy as a healthy level). If the data storage device is within the intermediate level, the process 1000 may determine whether the operational parameter associated with the data stored therein is above a predefined amount at 1010. If so, the process 1000 may cause the first data to be stored in a second data storage device within the first level (i.e., the data may be moved to a healthier storage device within the system) at 1012. The process 1000 may then end at 1014 by reallocating storage space of the first storage device (in some examples, reallocating the memory such that it is only available for future storage of second data with an operational parameter below the predefined amount.

Returning to 1008, when the process 1000 determines that the first data storage device is not within the second level, the process 1000 may then determine at 1016 whether the first data storage device is within a second health level. If so, the process 1000 may cause first data to be stored in the second data storage device of the first level at 1018 (e.g., similar to at 1012). Additionally, the process 1000 may end at 1020 by decommissioning storage space of the first data storage device, such that the storage space is no longer available for storage (in some cases, effectively decommissioning the first data storage device). Alternatively, returning to 1010 and/or 1016, if process 1000 either determines that the operational parameter of data in the first storage device is not above the predefined amount or determines that the first data storage device is not within the second health level, the process 1000 may end at 1022 by maintaining the first data stored in the first data storage device.

Figure 11:
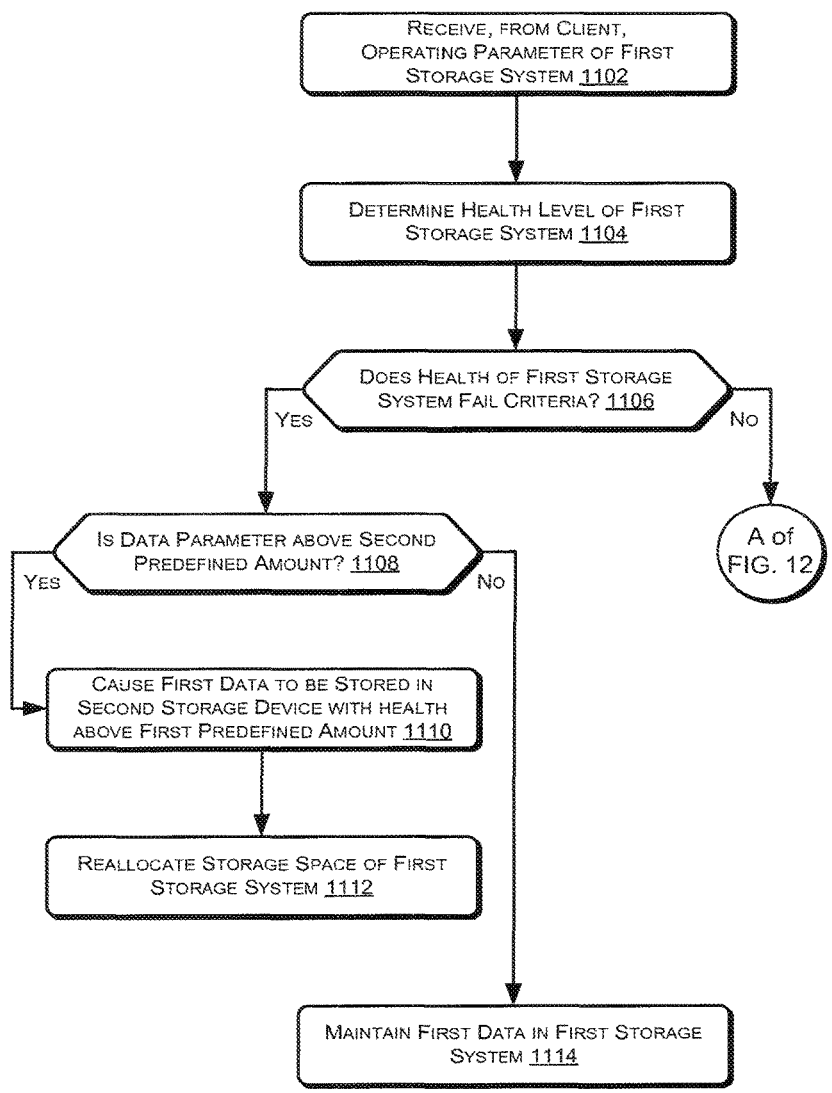
Figure 12:
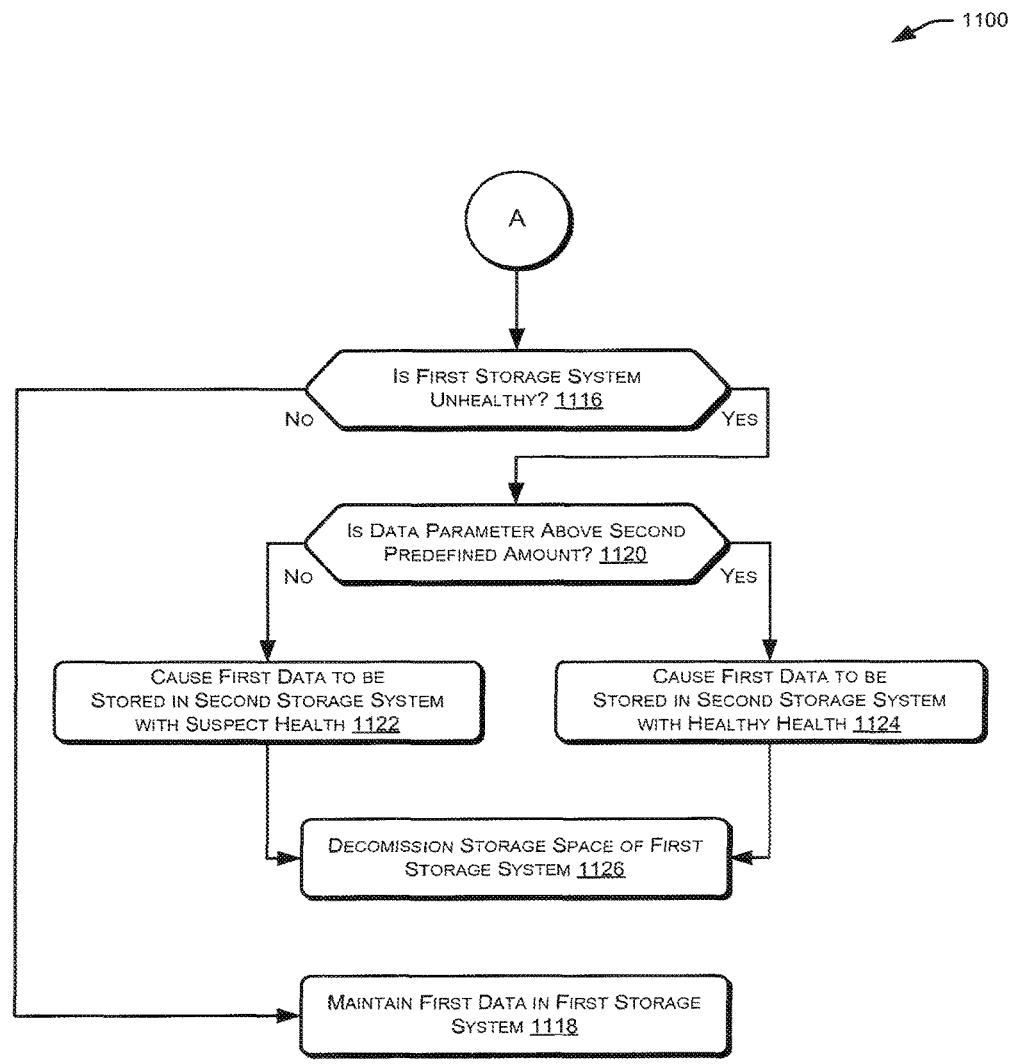

FIGS. 11 and 12 illustrate an example process 1100 for implementing additional features of the example architecture 100 of FIG. 1 in which techniques for drive health determination and data placement may be implemented. In some aspects, the process 1100 may be performed by the distributed program execution service servers 102 shown in FIG. 1 and/or the distributed servers 402 of FIG. 4. The process 1100 may begin at 1102 by receiving, from a client entity of the one or more distributed program execution service servers 102 of FIG. 1, an operating parameter of a first storage system. At 1104, the process 1100 may determine a health level of the first storage system. At 1106, the process 1100 may then determine whether the health of the storage system fails a predefined criteria. Criteria may include probabilities of drive failure, drive capability determinations, drive health level determinations, or the like. In some aspects, if the health of the storage system fails the criteria, the process 1100 may determine if a data parameter of data stored in the data system is above a second predefined amount at 1108. In some examples, the second predefined amount may indicate a performance preference of the data (e.g., desired persistence, desired security, desired latency, etc.). If so, at 1110, the process 1100 may cause first data (i.e., that which has a data parameter above the predefined amount) to be stored in a second storage system with a health level that is above the first predefined amount. The process 1100 may then end at 1112 by reallocating storage space of the first storage system (in some examples, reallocating the memory such that it is only available for future storage of second data with an operational parameter below the predefined amount. On the other hand, if the data parameter is determined to be below the second predefined amount at 1108, the process 100 may end by maintaining the first data in the first storage system at 1114.

Returning to 1106, when the process 1100 determines that the health of the first storage system does not fail the criteria, the process 1100 may then proceed to A of FIG. 12 where the process 1100 may determine if the first storage system is unhealthy at 1116. If it is not determined that the first storage system is unhealthy, the process 1100 may end by maintaining the first data in the first storage system at 1118. However, if it is determined at 1116 that the first storage system is unhealthy, the process 1100 may then determine at 1120 whether the data parameter is above the second predefined amount. If not, the process 1100 may cause the first data to be stored in a second storage system with suspect health at 1122. However, if so, the process 1100 may cause the first data to be stored in a second storage system with healthy health at 1124. In this way, if the data parameter and/or performance needs of the data indicate that the customer and/or client entity would like the data to be in a healthier or better performing memory, the data can be moved to the appropriate type of memory (e.g., to suspect memory when the data is less important and/or requested less often or to healthy memory when the data is more important and/or requested more often). In some aspects, the process 1100 may then end at 1126 by decommissioning the storage space of the first storage system such that no future data can be stored therein.

Figure 13:
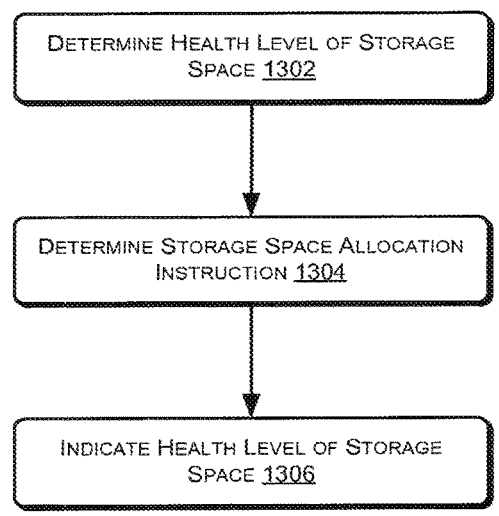

FIG. 13 illustrates an example process 1300 for implementing additional features of the example architecture 100 of FIG. 1 in which techniques for drive health determination and data placement may be implemented. In some aspects, the process 1300 may be performed by the distributed program execution service servers 102 shown in FIG. 1 and/or the distributed servers 402 of FIG. 4. The process 1300 may begin at 1302 by determining a health level of a storage space. At 1304, the process 1300 may determine, based at least in part on the determined health level, a storage space allocation instruction. Storage space allocation instructions may include, but are not limited to, storing or otherwise moving data sets, data volumes, data blocks, etc., allocating and/or reallocating space for particular purposes and/or particular data, and/or de-allocating space to ensure that no additional data is stored therein. In some aspects, the process 1300 may end at 1306 by indicating the health level of the storage space. This indication may come in the form of a set flag, an attribute, and/or information stored at the client entity, the distributed servers, and/or the storage spaced itself.

Figure 14:
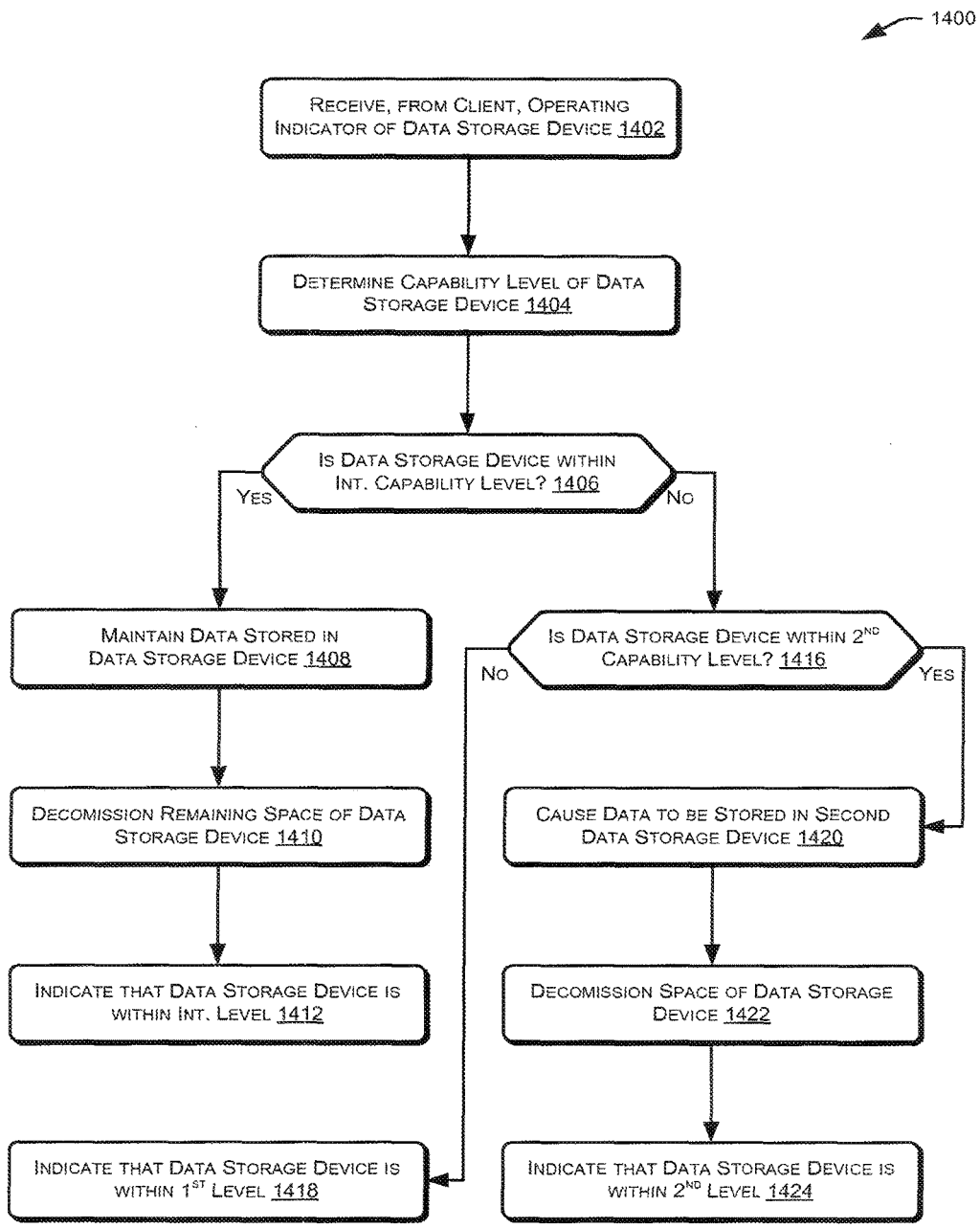

FIG. 14 illustrates an example process 1400 for implementing additional features of the example architecture 100 of FIG. 1 in which techniques for drive health determination and data placement may be implemented. In some aspects, the process 1400 may be performed by the distributed program execution service servers 102 shown in FIG. 1 and/or the distributed servers 502 of FIG. 5. The process 1400 may begin at 1402 by receiving, from a client entity of the distributed program execution service servers 102 of FIG. 1, an operating indicator of a data storage device. At 1404, the process 1400 may determine a capability level of the first data storage device. At 1406, the process 1400 may then determine whether the first data storage device is within an intermediate capability level. If the data storage device is within the intermediate capability level, the process 1400 may maintain the data stored in the data storage device at 1408. The process 1400 may then decommission the remaining space of the data storage device such that no additional data can be stored therein (i.e., only leaving the stored data therein) at 1410. The process 1400 may then end at 1412 by indicating that the data storage device is within the intermediate capability level.

Returning to 1416, when the process 1400 determines that the data storage device is not within the intermediate capability level, the process 1400 may then determine at 1416 whether the data storage device is within a second capability level (e.g., below the intermediate level). If not, the process 1400 may end at 1418 by indicating that the data storage device is within the first capability level. However, if it is determined at 1416 that the data storage device is within the second capability level, the process 1400 may cause data to be stored in a second data storage device of the first capability level at 1420. Additionally, the process 1400 may then decommission the space of the data storage device at 1422 and end at 1422 by indicating that the data storage device is within the second capability level.

Figure 15:
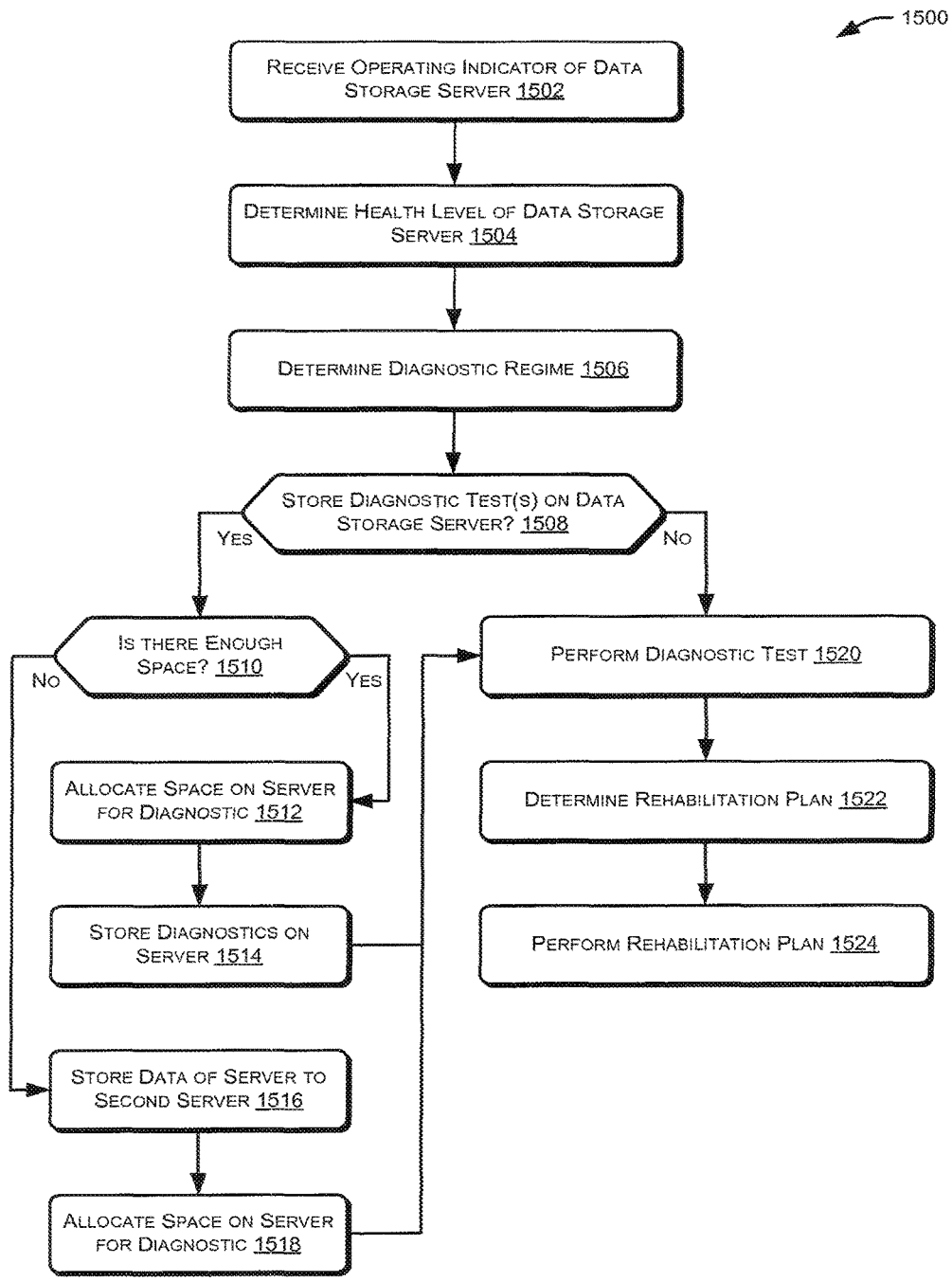
Figure 3:
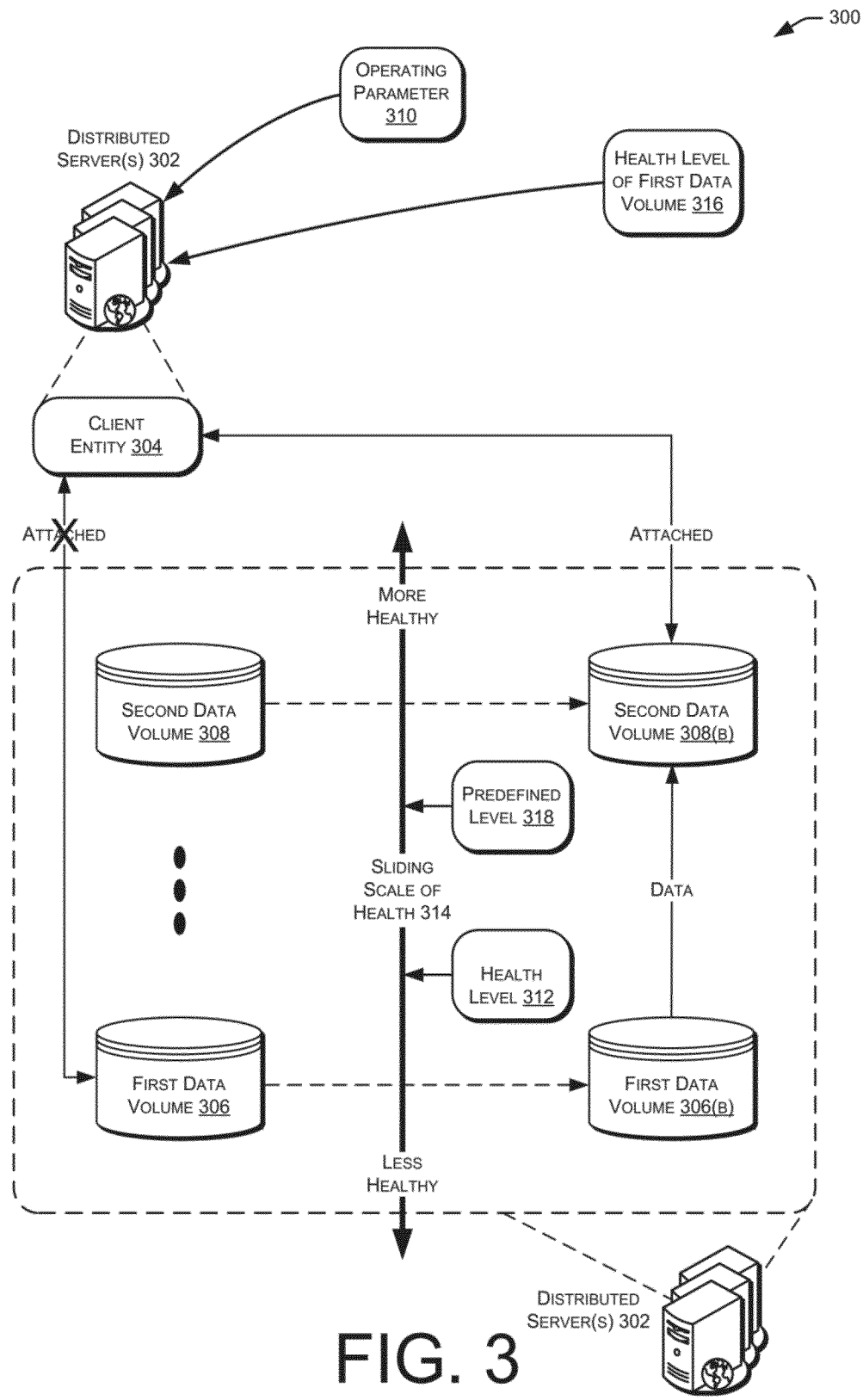
Figure 5:
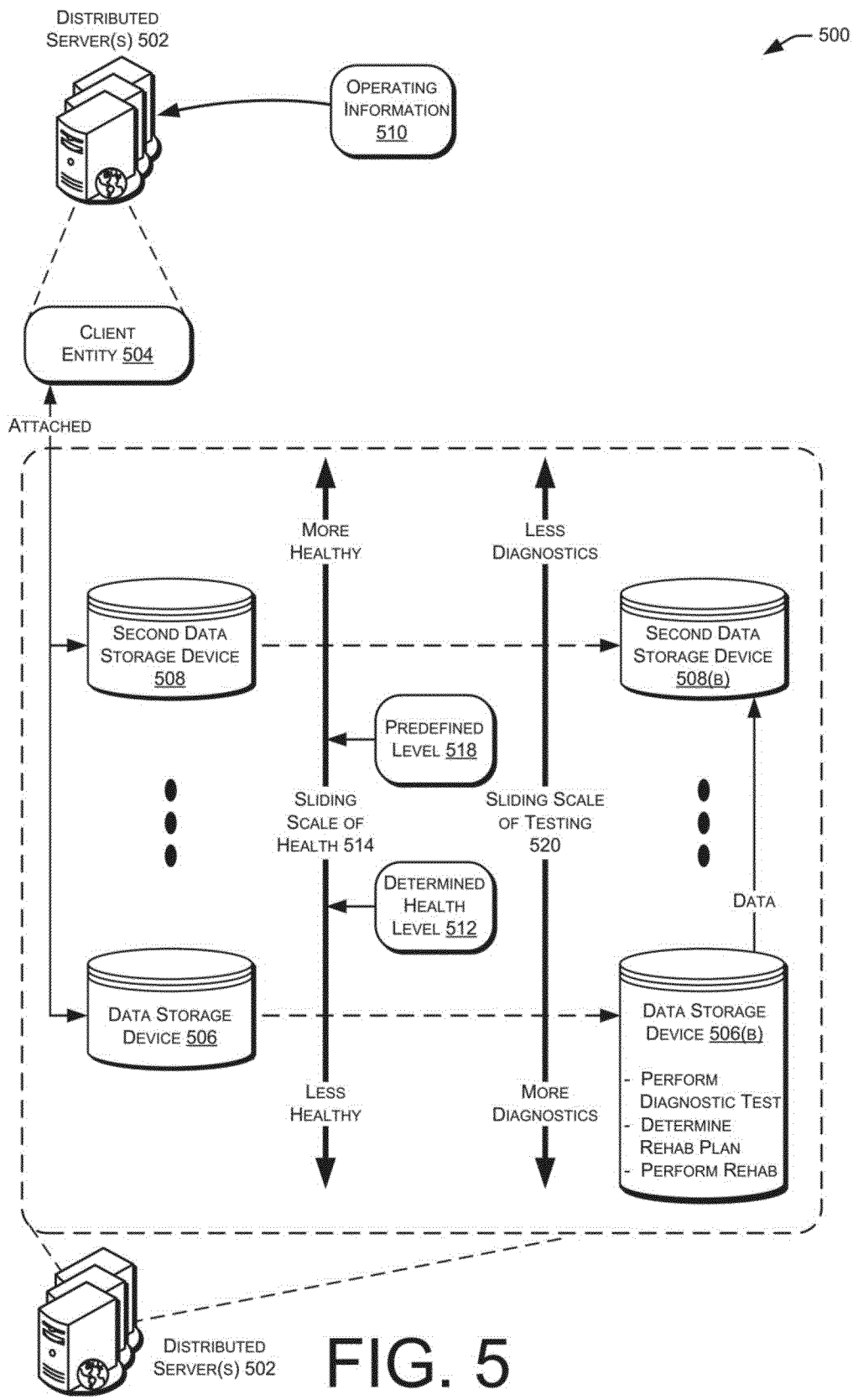
Figure 6:
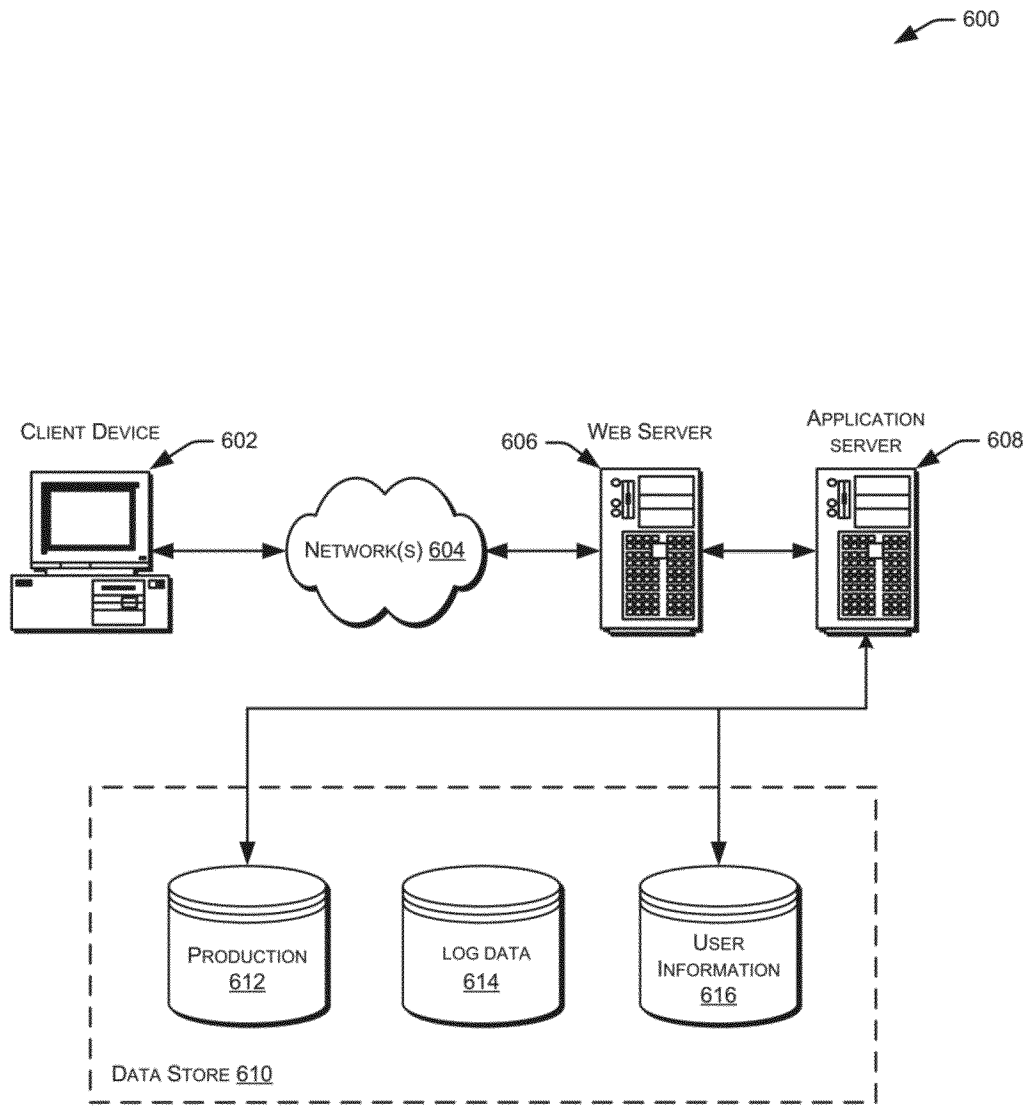

FIG. 15 illustrates an example process 1500 for implementing additional features of the example architecture 100 of FIG. 1 in which techniques for drive health determination and data placement may be implemented. In some aspects, the process 1500 may be performed by the distributed program execution service servers 102 shown in FIG. 1 and/or the distributed servers 502 of FIG. 5. The process

1500 may begin at 1502 by receiving an operating indicator of a data storage server. At 1504, the process 1500 may determine a health level of the data storage server. At 1506, the process 1500 may then determine a diagnostic regime. Additionally, the process 1500 may determine whether instructions for performing diagnostic tests associated with the diagnostic regime should be stored in the data storage server at 1508. If it is determined at 1508 that the diagnostic instructions should be stored in the data storage server, the process 1500 may then determine if there is sufficient room or capabilities for storing the instructions in the data storage server at 1510. If it is determined that the diagnostics tests can be stored in the data storage server, the process 1500 may allocate space on the server for the diagnostic instructions at 1512. The diagnostic instructions may then be stored on the data storage server at 1514.

However, if it is determined that the instructions cannot be stored in the data storage server, the process may instead store the instructions in a second data storage server at 1516. The process may then allocate space on the first data storage server for the instructions. In this way, when there is sufficient room for the instructions, space may be allocated and the instructions may be stored. However, if there is insufficient space for the instructions, data can first be moved, then space can be allocated, and then the instructions can be stored in the space that previously was occupied by the data. Returning to 1508, when it is determined that the instructions should not be stored in the data storage server (or following either 1514 or 1518), the process 1500 may perform the diagnostic tests on the first data storage server at 1520. Additionally, the process 1500 may determine a rehabilitation plan based at least in part on the results of the diagnostic tests at 1522. Further, the process 1500 may end at 1524 by performing the rehabilitation plan.

Illustrative methods and systems for providing drive failure detection, drive health determination, and/or data placement are described above. Some or all of these systems and methods may, but need not, be implemented at least partially by architectures such as those shown in FIGS. 1-15 above.

Although embodiments have been described in language specific to structural features and/or methodological acts, it is to be understood that the disclosure is not necessarily limited to the specific features or acts described. Rather, the specific features and acts are disclosed as illustrative forms of implementing the embodiments. Conditional language, such as, among others, "can," "could," "might," or "may," unless specifically stated otherwise, or otherwise understood within the context as used, is generally intended to convey that certain embodiments could include, while other embodiments do not include, certain features, elements, and/or steps. Thus, such conditional language is not generally intended to imply that features, elements, and/or steps are in any way required for one or more embodiments or that one or more embodiments necessarily include logic for deciding, with or without user input or prompting, whether these features, elements, and/or steps are included or are to be performed in any particular embodiment.

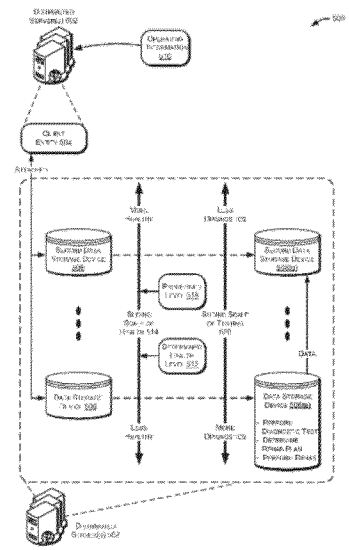

What is claimed is:

1. One or more computer-readable media collectively storing computer-executable instructions for data storage management that, as a result of being executed by one or more processors, causes the one or more processors to perform operations comprising:

determining, based at least in part on operation information of a storage space received from a device of a computing system, a health level of the storage space, the health level of the storage space being based at least in part on a health scale indicating one or more health levels above a non-operational level, where the operation information indicates one or more attributes of the device;

determining, based at least in part on the health level of the storage space, an instruction for the one or more processors to execute associated with data stored in the storage space;

indicating the health level of the storage space to specify one or more predefined activities defined by the health level for data stored in the storage space; and performing a remedial operation based at least the one or more predefined activities.

2. The one or more computer-readable media of claim 1, wherein the health scale is based at least in part on at least a healthy level indicating a first failure probability, a suspect level that is less healthy than the healthy level indicating a second failure probability higher than the first failure probability, and an unhealthy level that is less healthy than the suspect level indicating a third failure probability higher than the second failure probability.

3. The one or more computer-readable media of claim 2, wherein the operation information is based at least in part on a write latency associated with the storage space.

4. The one or more computer-readable media of claim 1, wherein the one or more predefined activities further includes storing data stored in the storage space in a second storage space with a health level above a predefined level.

5. The one or more computer-readable media of claim 1, wherein the operation information is based at least in part on a read latency associated with the storage space.

6. The one or more computer-readable media of claim 1, wherein indicating the health level of the storage space comprises at least setting a flag associated with the storage space or indicating the health level in a data structure associated with the storage space to specify the one or more predefined activities that are appropriate for the data stored in the storage space.

7. The one or more computer-readable media of claim 1, wherein the one or more attributes of the device include at least one of: read latency, write latency, difference between read latency and write latency, packet loss data, spin-up time, seek time, attempts to complete an operation, temperature, software, software version information, or a variance between the one or more attributes of the device.

8. A computer-implemented method comprising:

receiving an indicator associated with a storage device indicating a level of health associated with the storage device to perform operations on data stored in the storage device, the level of health obtained from a plurality of possible health levels included in one or more health levels; and determining, based at least in part on the indicator, that the level of health associated with the storage device is within an intermediate level of health of the one or more health levels by at least:

maintaining data stored in the storage device;

causing one or more actions to be performed that disable reading or writing to a remaining storage space of the storage device such that no additional data can be read from or written to the storage device; and associating the storage device within the intermediate level of health in a data store to enable an administrative computer system to utilize the storage device for one or more purposes appropriate, for the intermediate level of health.

9. The computer-implemented method of claim 8, wherein the one or more health levels include at least a first level of health that indicates a low probability of failure, a second level of health that indicates a medium probability of failure that is higher than that of the first level of health, and a third level of health that indicates a high probability of failure that is higher than that of the second level of health.

10. The computer-implemented method of claim 9, further comprising, as a result of determining that the level of health of the storage device is within the third level of health:
 causing data of the storage device to be stored in a second storage device;
 causing one or more actions to be performed that disable operations to a storage space within the storage device; and
 associating the storage device within the third level of health in the data store to enable the administrative computer system to utilize the storage device for one or more purposes associated with the third level of health.

11. The computer-implemented method of claim 8, wherein the remaining storage space of the storage device further comprises storage space that is not allocated to a user.

12. The computer-implemented method of claim 8, wherein the indicator associated with the storage device further includes at least one of a spin-up time or a seek time associated with the storage device.

13. The computer-implemented method of claim 8, wherein the indicator associated with the storage device further includes an indication of firmware, executed by the storage device, that causes disk degradation.

14. A system, comprising:
 one or more processors; and
 memory that includes instructions that, as a result of being executed by the one or more processors, cause the system to:
  receive information associated with a physical or software performance indicator associated with a storage device;
  determine, based at least in part on the information, a health level of the storage device, the health level from a scale of possible health levels, at least one health level of the scale of possible health levels includes an intermediate health level between at least a first health level and a second health level;
  associate the health level with the storage devices; and
  perform a remedial action based at least in part on the health, where the health level indicates at one or more remedial actions for storage devices associated with the health level.

15. The system of claim 14, wherein the physical performance indicator associated with the storage device is based at least in part on at least one of a latency for a read request, a latency for a write request, a spin-up time, a seek time, a number of attempts to complete an operation, a temperature, or an overall variance in behavior associated with the storage device.

16. The system of claim 14, wherein the software performance indicator associated with the storage device is based at least in part on at least one of a type of software associated with the storage device or a predefined software detail associated with performance of the storage device.

17. The system of claim 14, wherein the first health level indicates that the storage device is healthy, the intermediate health level indicates that the storage device is suspect, and the second health level indicates that the storage device is non-operational.

18. The system of claim 14, wherein the one or more remedial actions indicated by the health level further includes storing data, stored in the storage device, to a second storage device with a health level indicating a lower probability of failure, wherein the first health level has a lower probability of failure than the intermediate health level, and wherein the intermediate health level has a lower probability of failure than the second health level.

* * * * *

UNITED STATES PATENT AND TRADEMARK OFFICE
CERTIFICATE OF CORRECTION

PATENT NO. : 9,754,337 B2
APPLICATION NO. : 14/243752
DATED : September 5, 2017
INVENTOR(S) : Brooker et al.

It is certified that error appears in the above-identified patent and that said Letters Patent is hereby corrected as shown below:

On the Title Page

Delete the title page and substitute therefore with the attached title page consisting of the corrected illustrative figure In the Drawings Please replace FIGS. 3, 5, 6 with FIGS. 3, 5, 6 as shown on the attached pages In the Specification Column 4, Line 40:
"or more third-party computers 108, and/or one or more other"
Should read as:
--one or more third-party service servers 108, and/or one or more other--

Column 6, Line 63:
"present the volumes 114, 116 to the client instance 104."
Should read as:
--present the data volumes 114, 116 to the client instance 104.--

Column 9, Line 40:
"In at least one example, the control plane 206 further"
Should read as:
--In at least one example, the service control plane 206 further--

Column 12, Line 6:
"and transfer 244 through the network to the high durability"
Should read as:
--and transfer through the network to the high durability--

Signed and Sealed this
Third Day of November, 2020

Andrei Iancu
*Director of the United States Patent and Trademark Office*

CERTIFICATE OF CORRECTION (continued)
U.S. Pat. No. 9,754,337 B2

Column 12, Line 53:
"being transferred 244 from the low latency data store 220 to"
Should read as:
--being transferred from the low latency data store 220 to--

Column 14, Line 13:
"whether the determined health level 312 is above or below"
Should read as:
--whether the health level 312 is above or below--

Column 14, Line 19:
"level 318, the distributed servers 302 may cause certain data"
Should read as:
--level of health 318, the distributed servers 302 may cause certain data--

Column 14, Line 34:
"the first data volume 306 is below the predefined level 318"
Should read as:
--the first data volume 306 is below the predefined level of health 318--

Column 16, Line 16:
"stored therein in the future. The distribute servers 402 may"
Should read as:
--stored therein in the future. The distributed servers 402 may--

Column 17, Line 35:
"in part on the received operating parameters 510, a health"
Should read as:
--in part on the received operating parameters of operating information 510, a determined health--

Column 17, Line 62:
"spectrum, the distributed serves 502 may perform a higher"
Should read as:
--spectrum, the distributed servers 502 may perform a higher--

Column 18, Line 3:
"rehabilitation. For example, the servers 502 may request"
Should read as:
--rehabilitation. For example, the distributed servers 502 may request--

Column 18, Line 6:
"the servers 502 may may perform more testing and/or more"
Should read as:
--the distributed servers 502 may may perform more testing and/or more--

Column 18, Line 8:
"As noted above, the distributed serves 502 may determine"
Should read as:
--As noted above, the distributed servers 502 may determine--

Column 18, Line 11:
"the servers 502 may then determine a diagnostic testing"
Should read as:
--the distributed servers 502 may then determine a diagnostic testing--

Column 18, Line 14:
"regime has been performed, the servers 502 may determine"
Should read as:
--regime has been performed, the distributed servers 502 may determine--

Column 18, Line 24:
"level of health 518. In this example, the servers 502 may"
Should read as:
--level of health 518. In this example, the distributed servers 502 may--

Column 24, Line 11:
"whether the performance level is above a predefined"
Should read as:
--whether the performance level is below a predefined--

Column 24, Line 13:
"the performance level is above the predefined level, the"
Should read as:
--the performance level is below the predefined level, the--

Column 24, Line 21:
"is not above the predefined level, the process 900 may"
Should read as:
--is not below the predefined level, the process 900 may--

Column 24, Line 58:
"an operational parameter below the predefined amount."
Should read as:
--an operational parameter below the predefined amount).--

Column 25, Line 34:
"system with a health level that is above the first predefined"
Should read as:
--system device with a health level that is above the first predefined--

Column 26, Line 59:
"1422 and end at 1422 by indicating that the data storage"
Should read as:
--1422 and end at 1424 by indicating that the data storage--

(12) United States Patent
Brooker et al.

(10) Patent No.: US 9,754,337 B2
(45) Date of Patent: Sep. 5, 2017

(54) SERVER-SIDE, VARIABLE DRIVE HEALTH DETERMINATION

(71) Applicant: Amazon Technologies, Inc., Reno, NV (US)

(72) Inventors: Marc J. Brooker, Seattle, WA (US); Madhuvanesh Parthasarathy, Renton, WA (US); Danny Wei, Seattle, WA (US); Tobias L. Holgers, Seattle, WA (US); Yu Li, Seattle, WA (US)

(73) Assignee: Amazon Technologies, Inc., Seattle, WA (US)

( * ) Notice: Subject to any disclaimer, the term of this patent is extended or adjusted under 35 U.S.C. 154(b) by 198 days.

(21) Appl. No.: 14/243,752

(22) Filed: Apr. 2, 2014

(65) Prior Publication Data
US 2014/0214447 A1    Jul. 31, 2014

Related U.S. Application Data

(62) Division of application No. 13/434,446, filed on Mar. 29, 2012, now Pat. No. 8,719,320.

(51) Int. Cl.
| | |
|---|---|
| *G06F 17/30* | (2006.01) |
| *G06F 3/06* | (2006.01) |
| *G06Q 50/22* | (2012.01) |
| *G06Q 10/10* | (2012.01) |
| *G06F 11/00* | (2006.01) |

(52) U.S. Cl.
CPC .............. *G06Q 50/22* (2013.01); *G06F 11/00* (2013.01); *G06Q 10/10* (2013.01)

(58) Field of Classification Search
USPC ....... 707/827; 711/170, 100; 714/2; 709/206
See application file for complete search history.

(56) References Cited

U.S. PATENT DOCUMENTS

| | | |
|---|---|---|
| 4,144,583 A | 3/1979 | Lawson et al. |
| 4,357,656 A | 11/1982 | Saltz et al. |
| 5,075,804 A | 12/1991 | Deyring |
| 5,438,559 A | 8/1995 | Best et al. |
| 5,627,842 A | 5/1997 | Brown et al. |
| 5,757,818 A | 5/1998 | Ashuri |
| 5,784,323 A | 7/1998 | Adams et al. |
| 5,828,583 A | 10/1998 | Bush et al. |
| 5,895,438 A | 4/1999 | Yomtoubian |

(Continued)

OTHER PUBLICATIONS

U.S. Appl. No. 13/434,446, filed Mar. 29, 2012.

(Continued)

*Primary Examiner* — Hung T Vy
(74) *Attorney, Agent, or Firm* — Davis Wright Tremaine LLP

(57) ABSTRACT

The relative health of data storage drives may be determined based, at least in some aspects, on data access information and/or other drive operation information. In some examples, upon receiving the operation information from a computing device, a health level of a drive may be determined. The health level determination may be based at least in part on operating information received from a client entity. Additionally, a storage space allocation instruction or operation may be determined for execution. The allocation instruction or operation determined to be performed may be based at least in part on the determined health level.

18 Claims, 15 Drawing Sheets